(12) United States Patent
Park et al.

(10) Patent No.: US 12,284,330 B2
(45) Date of Patent: Apr. 22, 2025

(54) IMAGE ENCODING/DECODING METHOD AND APPARATUS, AND METHOD OF TRANSMITTING BITSTREAM USING SEQUENCE PARAMETER SET INCLUDING INFORMATION ON MAXIMUM NUMBER OF MERGE CANDIDATES

(71) Applicant: LG ELECTRONICS INC., Seoul (KR)

(72) Inventors: Nae Ri Park, Seoul (KR); Jung Hak Nam, Seoul (KR); Hyeong Moon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/860,547

(22) Filed: Jul. 8, 2022

(65) Prior Publication Data

US 2022/0368891 A1 Nov. 17, 2022

Related U.S. Application Data

(63) Continuation of application No. PCT/KR2021/000380, filed on Jan. 12, 2021.

(Continued)

(51) Int. Cl.
*H04N 19/105* (2014.01)
*H04N 19/137* (2014.01)
(Continued)

(52) U.S. Cl.
CPC ......... *H04N 19/105* (2014.11); *H04N 19/137* (2014.11); *H04N 19/176* (2014.11); *H04N 19/46* (2014.11)

(58) Field of Classification Search
CPC .. H04N 19/105; H04N 19/137; H04N 19/176; H04N 19/46
See application file for complete search history.

(56) References Cited

U.S. PATENT DOCUMENTS

| | | | |
|---|---|---|---|
| 2019/0058896 A1 | 2/2019 | Huang et al. | |
| 2019/0246103 A1 | 8/2019 | Jun et al. | |

(Continued)

FOREIGN PATENT DOCUMENTS

| | | |
|---|---|---|
| CN | 107079161 A | 8/2017 |
| CN | 107211156 A | 9/2017 |

(Continued)

OTHER PUBLICATIONS

Benjamin Bross et al., "Versatile Video Coding (Draft 7)", JVET-P2001-vE, Joint Video Experts Team (JVET) of ITU-T SG 16 WP 3 and ISO/IEC JTC 1/SC 29/WG 11, 16th Meeting: Geneva, CH, pp. 1-465, Oct. 1-11, 2019, see pp. 38, 40, 45, 47, 118 and 211-216.

(Continued)

*Primary Examiner* — Francis Geroleo
(74) *Attorney, Agent, or Firm* — Bryan Cave Leighton Paisner LLP

(57) ABSTRACT

An image encoding/decoding method and apparatus are provided. An image decoding method according to the present disclosure is performed by an image decoding apparatus. The image decoding method comprises constructing a merge candidate list for a current block based on a prediction mode of the current block, deriving motion information of the current block based on the merge candidate list, and generating a prediction block of the current block based on the motion information. Information on a maximum number of merge candidates included in the merge candidate list may be obtained through a sequence parameter set, and, based on the prediction mode being a subblock-based merge mode, the maximum number of merge candi- (Continued)

dates may be determined based on whether an affine mode is available for the current block.

3 Claims, 13 Drawing Sheets

Related U.S. Application Data

(60) Provisional application No. 62/960,123, filed on Jan. 12, 2020.

(51) Int. Cl.
*H04N 19/176* (2014.01)
*H04N 19/46* (2014.01)

(56) References Cited

U.S. PATENT DOCUMENTS

| | | | |
|---|---|---|---|
| 2021/0258570 A1* | 8/2021 | Chen | G06T 9/40 |
| 2022/0132144 A1* | 4/2022 | Sauer | H04N 19/172 |
| 2022/0303571 A1* | 9/2022 | Zhang | H04N 19/176 |
| 2022/0394301 A1* | 12/2022 | Deshpande | H04N 19/172 |

FOREIGN PATENT DOCUMENTS

| | | | | |
|---|---|---|---|---|
| CN | 110662057 A | | 1/2020 | |
| CN | 110677648 A | | 1/2020 | |
| CN | 111107354 A | | 5/2020 | |
| EP | 3852370 A1 | * | 7/2021 | ............... G06T 9/40 |
| GB | 2585017 A | | 12/2020 | |
| KR | 10-2015-0047414 A | | 5/2015 | |
| KR | 10-2018-0038371 A | | 4/2018 | |
| KR | 10-2019-0134521 A | | 12/2019 | |
| WO | 2015/180014 A1 | | 12/2015 | |
| WO | 2019199141 A1 | | 10/2019 | |
| WO | WO-2020088324 A1 | * | 5/2020 | ............... G06T 9/40 |

OTHER PUBLICATIONS

Martin Pettersson, et al., "AHG17: Parameters in SPS or slice headers", Joint Video Experts Team (JVET) of ITU-T SG 16 WP 3 and ISO/IEC JTC 1/SC 29/WG 11, 15th Meeting: Gothenburg, SE, Jul. 3-12, 2019. JVET-O0238.

* cited by examiner

FIG. 14

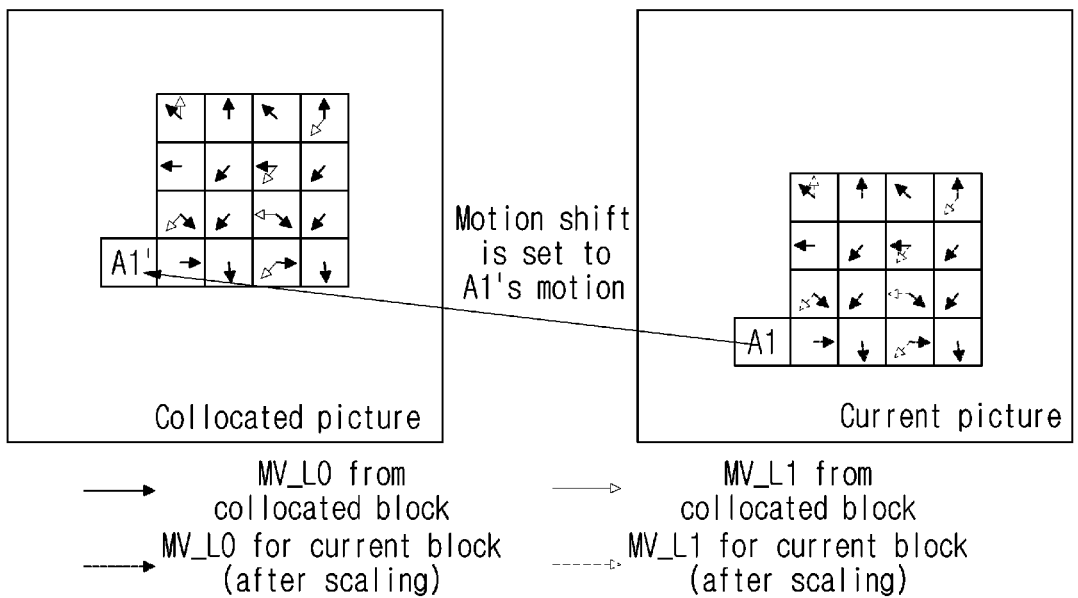

FIG. 15

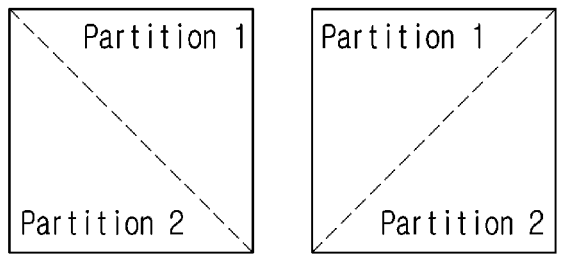

FIG. 16

| pic_parameter_set_rbsp( ) { | Descriptor |
|---|---|
| pps_pic_parameter_set_id | ue(v) |
| pps_seq_parameter_set_id | u(4) |
| pic_width_in_luma_samples | ue(v) |
| pic_height_in_luma_samples | ue(v) |
| ...... | |
| constant_slice_header_params_enabled_flag | u(1) |
| if( constant_slice_header_params_enabled_flag ) { | |
|   pps_dep_quant_enabled_idc | u(2) |
|   for( i = 0; i < 2; i++ ) | |
|     pps_ref_pic_list_sps_idc[ i ] | u(2) |
|   pps_mvd_l1_zero_idc | u(2) |
|   pps_collocated_from_l0_idc | u(2) |
|   pps_six_minus_max_num_merge_cand_plus1 | ue(v) |
|   pps_max_num_merge_cand_minus_max_num_triangle_cand_plus1 | ue(v) |
| } | |
| ...... | |
| } | |

FIG. 17

| picture_header_rbsp( ) { | Descriptor |
|---|---|
| ... | |
| if( sps_temporal_mvp_enabled_flag ) | |
|    pic_temporal_mvp_enabled_flag | u(1) |
| if( !pps_six_minus_max_num_merge_cand_plus1 ) | |
|    pic_six_minus_max_num_merge_cand | ue(v) |
| if( sps_affine_enabled_flag ) | |
|    pic_five_minus_max_num_subblock_merge_cand | ue(v) |
| if( sps_triangle_enabled_flag && MaxNumMergeCand >= 2 && | |
|     !pps_max_num_merge_cand_minus_max_num_triangle_cand_plus1 ) | |
|    pic_max_num_merge_cand_minus_max_num_triangle_cand | ue(v) |
| if( sps_ibc_enabled_flag ) | |
|    pic_six_minus_max_num_ibc_merge_cand | ue(v) |
| ...... | |
| } | |

FIG. 18

| pic_parameter_set_rbsp( ) { | Descriptor |
|---|---|
| pps_pic_parameter_set_id | ue(v) |
| pps_seq_parameter_set_id | u(4) |
| pic_width_in_luma_samples | ue(v) |
| pic_height_in_luma_samples | ue(v) |
| ... | |
| constant_slice_header_params_enabled_flag | u(1) |
| if( constant_slice_header_params_enabled_flag ) { | |
|    pps_dep_quant_enabled_idc | u(2) |
|    for( i = 0; i < 2; i++ ) | |
|      pps_ref_pic_list_sps_idc[ i ] | u(2) |
|    pps_mvd_l1_zero_idc | u(2) |
|    pps_collocated_from_l0_idc | u(2) |
| } | |
| ... | |
| } | |

FIG. 19

| seq_parameter_set_rbsp( ) { | Descriptor |
|---|---|
| ... | |
| sps_temporal_mvp_enabled_flag | u(1) |
| if( sps_temporal_mvp_enabled_flag ) { | |
| sps_sbtmvp_enabled_flag | u(1) |
| } | |
| sps_six_minus_max_num_merge_cand //for regular merge | ue(v) |
| sps_affine_enabled_flag | u(1) |
| if( sps_affine_enabled_flag ) { | |
| sps_affine_type_flag | u(1) |
| sps_affine_amvr_enabled_flag | u(1) |
| sps_affine_prof_enabled_flag | u(1) |
| if( sps_affine_prof_enabled_flag ) | |
| sps_prof_pic_present_flag | u(1) |
| sps_five_minus_max_num_subblock_merge_cand //for subblock(affine) | ue(v) |
| } | |
| sps_ibc_enabled_flag | u(1) |
| if(sps_ibc_enabled_flag) { | |
| sps_six_minus_max_num_ibc_merge_cand //for IBC | ue(v) |
| } | |
| sps_triangle_enabled_flag | u(1) |
| if(sps_triangle_enabled_flag && MaxNumMergeCand >= 2 ) { | |
| sps_max_num_merge_cand_minus_max_num_triangle_cand //for TPM(GEO) | ue(v) |
| } | |
| ... | |
| } | |

FIG. 20

| slice_header( ) { | Descriptor |
|---|---|
| ... | |
| if( slice_type != I ) { | |
| if( cabac_init_present_flag ) | |
| cabac_init_flag | u(1) |
| if(sps_temporal_mvp_enable_flag) { | |
| if( slice_type == B && !pps_collocated_from_l0_idc ) | |
| collocated_from_l0_flag | u(1) |
| if( ( collocated_from_l0_flag && NumRefIdxActive[ 0 ] > 1 ) \|\| | |
| ( !collocated_from_l0_flag && NumRefIdxActive[ 1 ] > 1 ) ) | |
| collocated_ref_idx | ue(v) |
| } | |
| if( ( pps_weighted_pred_flag && slice_type == P ) \|\| | |
| ( pps_weighted_bipred_flag && slice_type == B ) ) | |
| pred_weight_table( ) | |
| } | |

FIG. 21

| picture_header_rbsp( ) { | Descriptor |
|---|---|
| ... | |
| if( sps_temporal_mvp_enabled_flag ) | |
| pic_temporal_mvp_enabled_flag | u(1) |
| ... | |
| } | |

IMAGE ENCODING/DECODING METHOD AND APPARATUS, AND METHOD OF TRANSMITTING BITSTREAM USING SEQUENCE PARAMETER SET INCLUDING INFORMATION ON MAXIMUM NUMBER OF MERGE CANDIDATES

This application is a Continuation Application of International Application No. PCT/KR2021/000380, filed on Jan. 12, 2021, which claims the benefit of U.S. Provisional Application No. 62/960,123, filed on Jan. 12, 2020, the contents of which are all hereby incorporated by reference herein in their entirety.

TECHNICAL FIELD

The present disclosure relates to an image encoding/decoding method and apparatus and, more particularly, to an image encoding/decoding method and apparatus for encoding/decoding information on a maximum number of merge candidates included in a merge candidate list through a sequence parameter set, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus for encoding/decoding information on a maximum number of merge candidates through a sequence parameter set.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method according to an aspect of the present disclosure may comprise constructing a merge candidate list for a current block based on a prediction mode of the current block, deriving motion information of the current block based on the merge candidate list, and generating a prediction block of the current block based on the motion information. Information on a maximum number of merge candidates included in the merge candidate list may be obtained through a sequence parameter set, and, based on the prediction mode being a subblock-based merge mode, the maximum number of merge candidates may be determined based on whether an affine mode is available for the current block.

An image decoding apparatus according to another aspect of the present disclosure may comprise a memory and at least one processor. The at least one processor may be configured to construct a merge candidate list for a current block based on a prediction mode of the current block, derive motion information of the current block based on the merge candidate list, and generate a prediction block of the current block based on the motion information. Information on a maximum number of merge candidates included in the merge candidate list may be obtained through a sequence parameter set, and, based on the prediction mode being a subblock-based merge mode, the maximum number of merge candidates may be determined based on whether an affine mode is available for the current block.

An image encoding method according to another aspect of the present disclosure may comprise constructing a merge candidate list for a current block based on a prediction mode of the current block, deriving motion information of the current block based on the merge candidate list, and encoding the motion information and information on a maximum number of merge candidates included in the merge candidate list. The information on a maximum number of merge candidates included in the merge candidate list may be encoded through a sequence parameter set, and, based on the prediction mode being a subblock-based merge mode, the maximum number of merge candidates may be determined based on whether an affine mode is available for the current block.

In addition, a computer-readable recording medium according to another aspect of the present disclosure may store the bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide an image encoding/decoding method and apparatus using a sequence parameter set including information on a maximum number of merge candidates.

Also, according to the present disclosure, it is possible to provide an image encoding/decoding method and apparatus with improved signaling efficiency in an inter prediction mode based on a merge candidate list.

Also, according to the present disclosure, it is possible to provide an image encoding/decoding method and apparatus in which tool control is easy in an inter prediction mode based on a merge candidate list.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 14 is a view illustrating a method of deriving a motion vector field according to a sub-block based TMVP mode.

FIG. 15 is a view illustrating an example in which a current block is partitioned into two triangle partitions by applying a TPM.

FIG. 16 is a view illustrating an example of a picture parameter set (PPS) including information on a maximum number of merge candidates.

FIG. 17 is a view illustrating an example of a picture header including information on a maximum number of merge candidates.

FIG. 18 is a view illustrating an example of a picture parameter set (PPS) according to an embodiment of the present disclosure.

FIG. 19 is a view illustrating an example of a sequence parameter set (SPS) according to an embodiment of the present disclosure.

FIG. 20 is a view illustrating an example of a slice header according to an embodiment of the present disclosure.

FIG. 21 is a view illustrating an example of a picture header according to an embodiment of the present disclosure.

MODE FOR INVENTION

Figure 1:
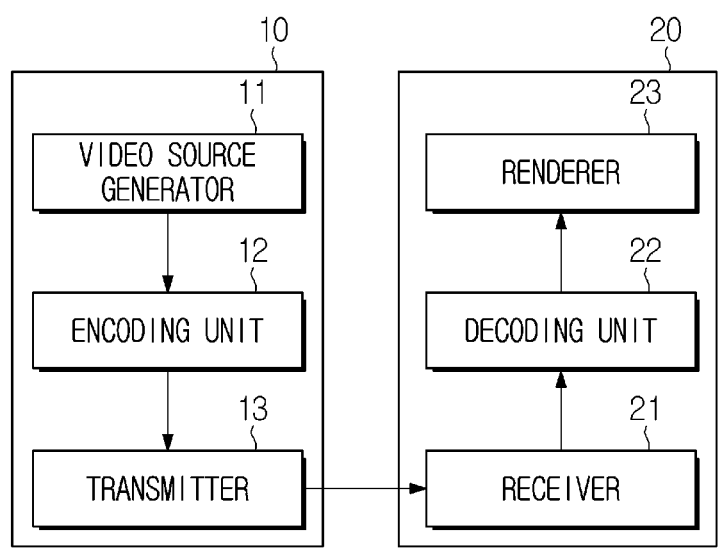
FIG. 1 is a view schematically illustrating a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block, such as "luma block" or "current luma block". In addition, the chroma component block of the current block may be explicitly expressed by including an explicit description of the chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
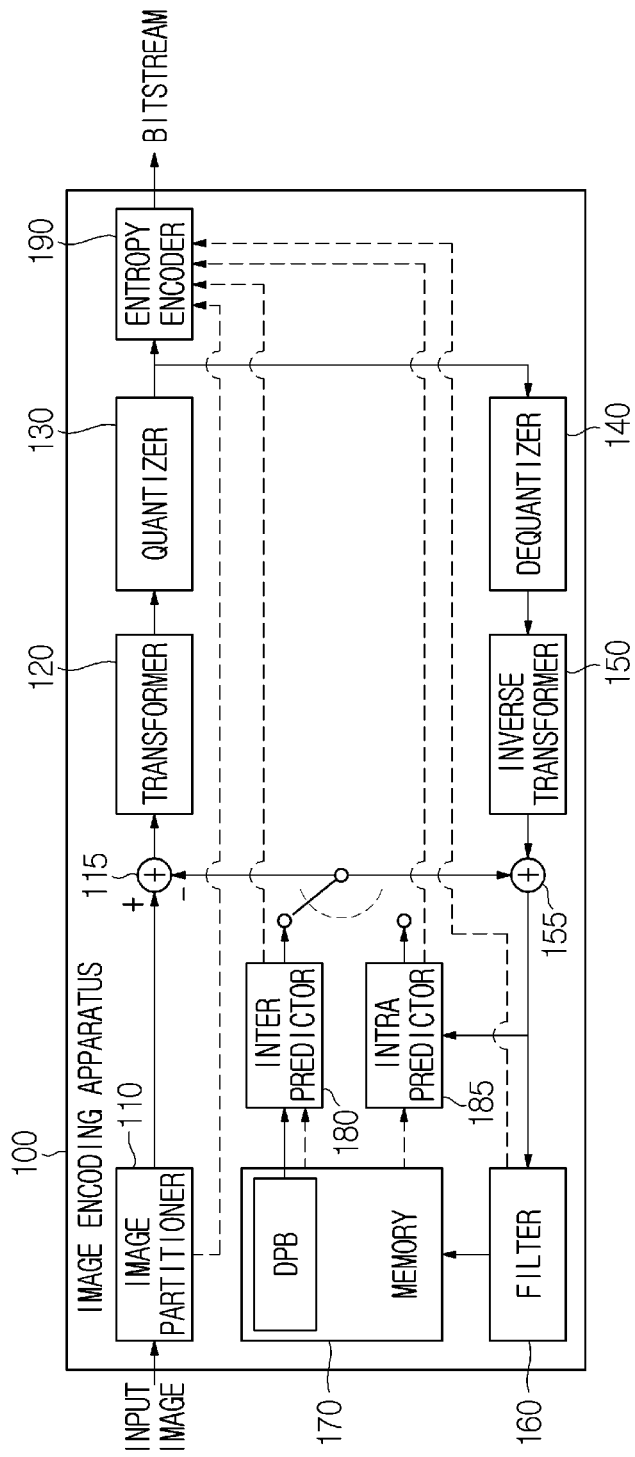
FIG. 2 is a view schematically illustrating an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi-prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
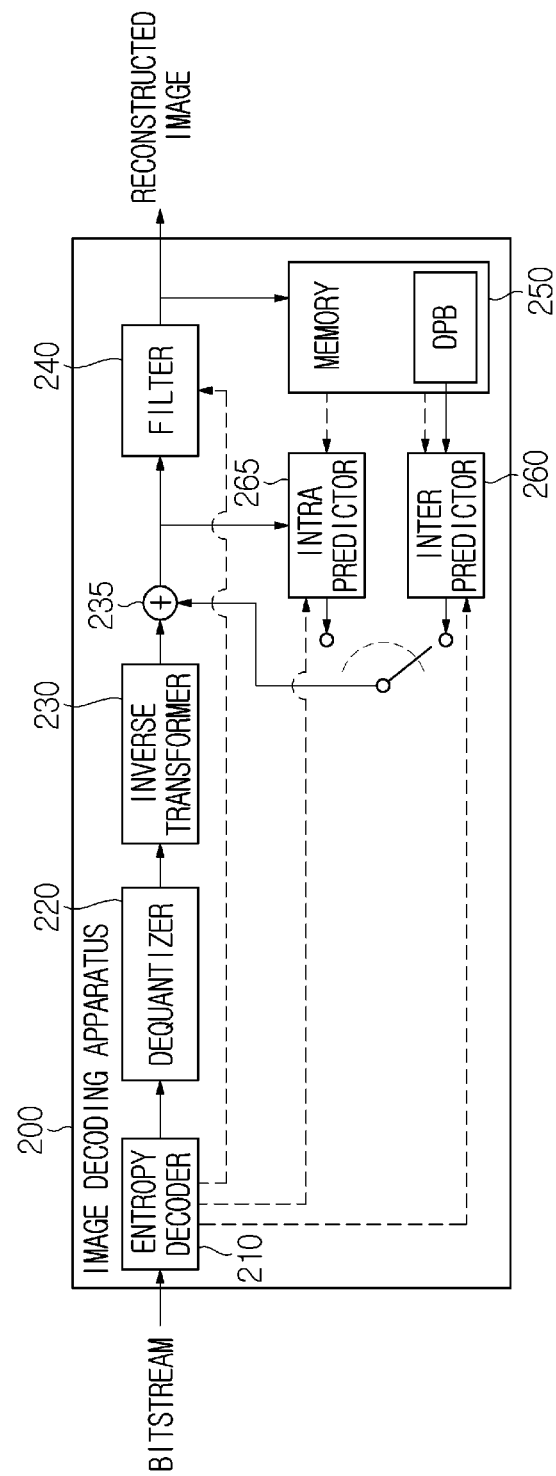
FIG. 3 is a view schematically illustrating an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi-prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Inter Prediction

An image encoding apparatus/image decoding apparatus may perform inter prediction in units of blocks to derive a prediction sample. Inter prediction may mean prediction derived in a manner that is dependent on data elements of picture(s) other than a current picture. When inter prediction applies to the current block, a predicted block for the current block may be derived based on a reference block specified by a motion vector on a reference picture.

In this case, in order to reduce the amount of motion information transmitted in an inter prediction mode, motion information of the current block may be derived based on correlation of motion information between a neighboring block and the current block, and motion information may be derived in units of blocks, subblocks or samples. The motion information may include a motion vector and a reference picture index. The motion information may further include inter prediction type information. Here, the inter prediction type information may mean directional information of inter prediction. The inter prediction type information may indicate that a current block is predicted using one of L0 prediction, L1 prediction or Bi-prediction.

When applying inter prediction to the current block, the neighboring block of the current block may include a spatial neighboring block present in the current picture and a temporal neighboring block present in the reference picture. A reference picture including the reference block for the current block and a reference picture including the temporal neighboring block may be the same or different. The temporal neighboring block may be referred to as a collocated reference block or collocated CU (colCU), and the reference picture including the temporal neighboring block may be referred to as a collocated picture (colPic).

Meanwhile, a motion information candidate list may be constructed based on the neighboring blocks of the current block, and, in this case, flag or index information indicating which candidate is used may be signaled in order to derive the motion vector of the current block and/or the reference picture index.

The motion information may include L0 motion information and/or L1 motion information according to the inter prediction type. The motion vector in an L0 direction may be defined as an L0 motion vector or MVL0, and the motion vector in an L1 direction may be defined as an L1 motion vector or MVL1. Prediction based on the L0 motion vector may be defined as L0 prediction, prediction based on the L1 motion vector may be defined as L1 prediction, and prediction based both the L0 motion vector and the L1 motion vector may be defined as Bi-prediction. Here, the L0 motion vector may mean a motion vector associated with a reference picture list L0 and the L1 motion vector may mean a motion vector associated with a reference picture list L1.

The reference picture list L0 may include pictures before the current picture in output order as reference pictures, and the reference picture list L1 may include pictures after the current picture in output order. The previous pictures may be defined as forward (reference) pictures and the subsequent pictures may be defined as backward (reference) pictures. Meanwhile, the reference picture list L0 may further include pictures after the current picture in output order as reference pictures. In this case, within the reference picture list L0, the previous pictures may be first indexed and the subsequent pictures may then be indexed. The reference picture list L1 may further include pictures before the current picture in output order as reference pictures. In this case, within the reference picture list L1, the subsequent pictures may be first indexed and the previous pictures may then be indexed. Here, the output order may correspond to picture order count (POC) order.

Figure 4:
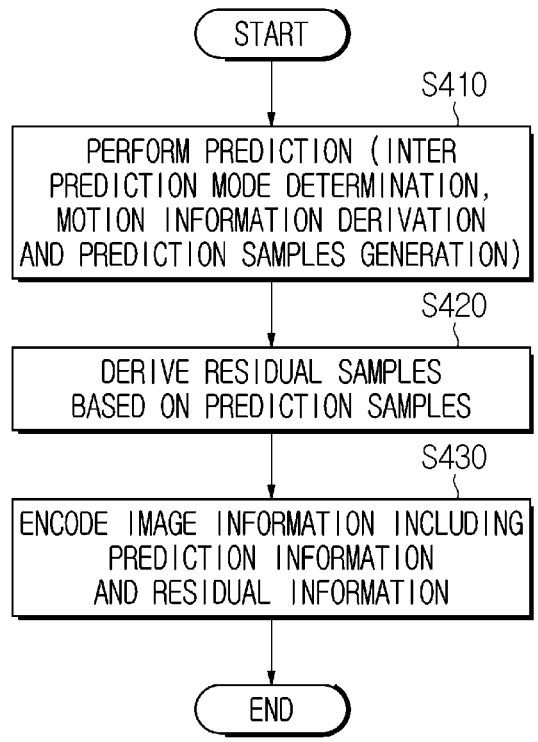
FIG. 4 is a flowchart illustrating an inter prediction based video/image encoding method.

FIG. 4 is a flowchart illustrating an inter prediction based video/image encoding method.

Figure 5:
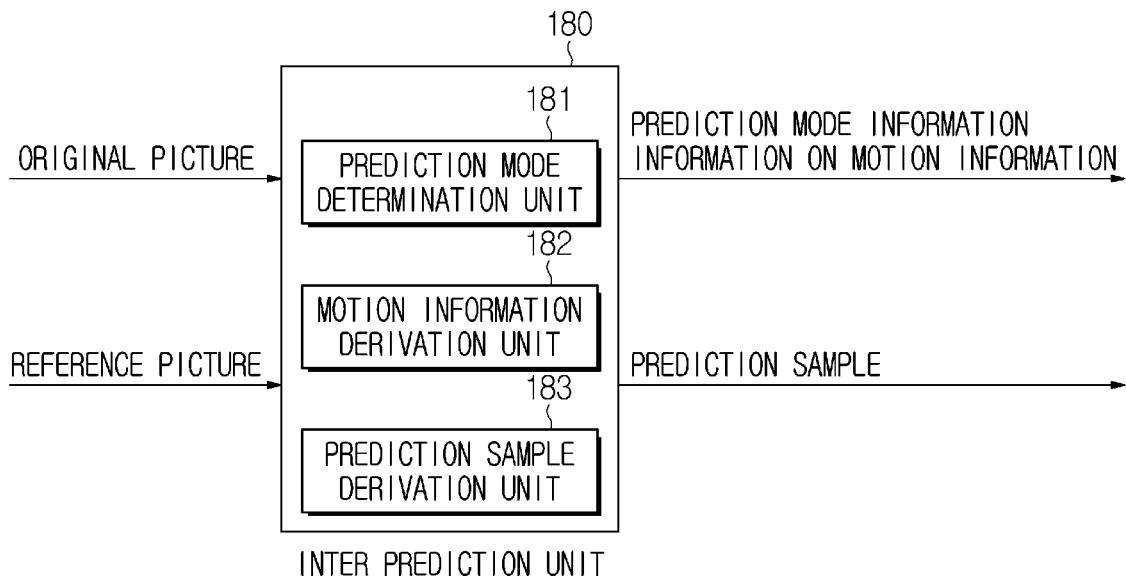
FIG. 5 is a view illustrating the configuration of an inter prediction unit 180 according to the present disclosure.

FIG. 5 is a view illustrating the configuration of an inter predictor 180 according to the present disclosure.

Figure 6:
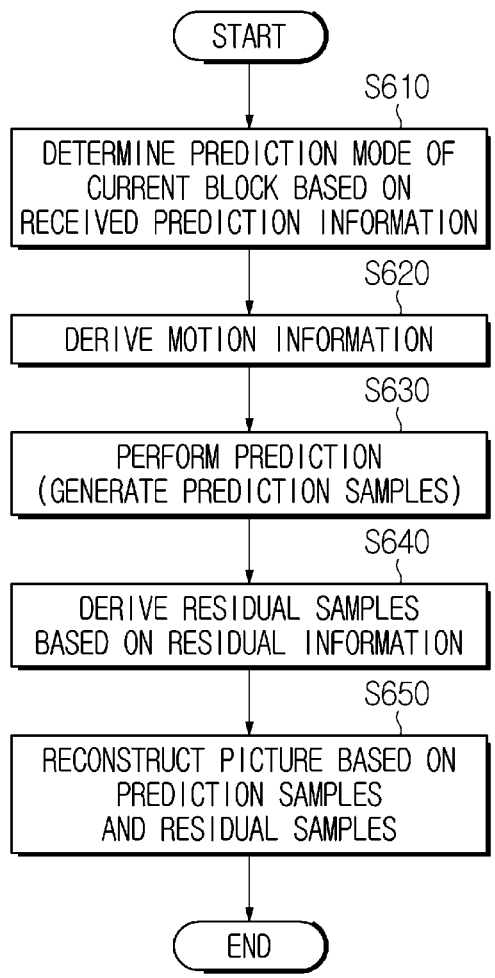
FIG. 6 is a flowchart illustrating an inter prediction based video/image decoding method.

The encoding method of FIG. 6 may be performed by the image encoding apparatus of FIG. 2. Specifically, step S410 may be performed by the inter predictor 180, and step S420 may be performed by the residual processor. Specifically, step S420 may be performed by the subtractor 115. Step S430 may be performed by the entropy encoder 190. The prediction information of step S630 may be derived by the inter predictor 180, and the residual information of step S630 may be derived by the residual processor. The residual information is information on the residual samples. The residual information may include information on quantized transform coefficients for the residual samples. As described above, the residual samples may be derived as transform coefficients through the transformer 120 of the image encoding apparatus, and the transform coefficient may be derived as quantized transform coefficients through the quantizer 130. Information on the quantized transform coefficients may be encoded by the entropy encoder 190 through a residual coding procedure.

The image encoding apparatus may perform inter prediction with respect to a current block (S410). The image encoding apparatus may derive an inter prediction mode and motion information of the current block and generate prediction samples of the current block. Here, inter prediction mode determination, motion information derivation and prediction samples generation procedures may be simultaneously performed or any one thereof may be performed before the other procedures. For example, as shown in FIG. 5, the inter prediction unit 180 of the image encoding apparatus may include a prediction mode determination unit 181, a motion information derivation unit 182 and a prediction sample derivation unit 183. The prediction mode determination unit 181 may determine the prediction mode of the current block, the motion information derivation unit 182 may derive the motion information of the current block, and the prediction sample derivation unit 183 may derive the prediction samples of the current block. For example, the inter prediction unit 180 of the image encoding apparatus may search for a block similar to the current block within a predetermined area (search area) of reference pictures through motion estimation, and derive a reference block whose difference from the current block is equal to or less than a predetermined criterion or a minimum. Based on this, a reference picture index indicating a reference picture in which the reference block is located may be derived, and a motion vector may be derived based on a position difference between the reference block and the current block. The image encoding apparatus may determine a mode applying to the current block among various inter prediction modes. The image encoding apparatus may compare rate-distortion (RD) costs for the various prediction modes and determine an optimal inter prediction mode of the current block. However, the method of determining the inter prediction mode of the current block by the image encoding apparatus is not limited to the above example, and various methods may be used.

For example, the inter prediction mode of the current block may be determined to be at least one of a merge mode, a merge skip mode, a motion vector prediction (MVP) mode, a symmetric motion vector difference (SMVD) mode, an affine mode, a subblock-based merge mode, an adaptive motion vector resolution (AMVR) mode, a history-based motion vector predictor (HMVP) mode, a pair-wise average merge mode, a merge mode with motion vector differences (MMVD) mode, a decoder side motion vector refinement (DMVR) mode, a combined inter and intra prediction (CIIP) mode or a geometric partitioning mode (GPM).

For example, when a skip mode or a merge mode applies to the current block, the image encoding apparatus may derive merge candidates from neighboring blocks of the current block and construct a merge candidate list using the derived merge candidates. In addition, the image encoding apparatus may derive a reference block whose difference from the current block is equal to or less than a predetermined criterion or a minimum, among reference blocks indicated by merge candidates included in the merge candidate list. In this case, a merge candidate associated with the derived reference block may be selected, and merge index information indicating the selected merge candidate may be generated and signaled to an image decoding apparatus. The motion information of the current block may be derived using the motion information of the selected merge candidate.

As another example, when an MVP mode applies to the current block, the image encoding apparatus may derive motion vector predictor (MVP) candidates from the neighboring blocks of the current block and construct an MVP candidate list using the derived MVP candidates. In addition, the image encoding apparatus may use the motion vector of the MVP candidate selected from among the MVP candidates included in the MVP candidate list as the MVP of the current block. In this case, for example, the motion vector indicating the reference block derived by the above-described motion estimation may be used as the motion vector of the current block, an MVP candidate with a motion vector having a smallest difference from the motion vector of the current block among the MVP candidates may be the selected MVP candidate. A motion vector difference (MVD) which is a difference obtained by subtracting the MVP from the motion vector of the current block may be derived. In this case, index information indicating the selected MVP candidate and information on the MVD may be signaled to the image decoding apparatus. In addition, when applying the MVP mode, the value of the reference picture index may be constructed as reference picture index information and separately signaled to the image decoding apparatus.

The image encoding apparatus may derive residual samples based on the prediction samples (S420). The image encoding apparatus may derive the residual samples through comparison between original samples of the current block and the prediction samples. For example, the residual sample may be derived by subtracting a corresponding prediction sample from an original sample.

The image encoding apparatus may encode image information including prediction information and residual information (S430). The image encoding apparatus may output the encoded image information in the form of a bitstream. The prediction information may include prediction mode information (e.g., skip flag, merge flag or mode index, etc.) and information on motion information as information related to the prediction procedure. Among the prediction mode information, the skip flag indicates whether a skip mode applies to the current block, and the merge flag indicates whether the merge mode applies to the current block. Alternatively, the prediction mode information may indicate one of a plurality of prediction modes, such as a mode index. When the skip flag and the merge flag are 0, it may be determined that the MVP mode applies to the current block. The information on the motion information may include candidate selection information (e.g., merge index, mvp flag or mvp index) which is information for deriving a motion vector. Among the candidate selection information, the merge index may be signaled when the merge mode applies to the current block and may be information for selecting one of merge candidates included in a merge candidate list. Among the candidate selection information, the MVP flag or the MVP index may be signaled when the MVP mode applies to the current block and may be information for selecting one of MVP candidates in an MVP candidate list. Specifically, the MVP flag may be signaled using a syntax element mvp_10_flag or mvp_11_flag. In addition, the information on the motion information may include information on the above-described MVD and/or reference picture index information. In addition, the information on the motion information may include information indicating whether to apply L0 prediction, L1 prediction or Bi-prediction. The residual information is information on the residual samples. The residual information may include information on quantized transform coefficients for the residual samples.

The output bitstream may be stored in a (digital) storage medium and transmitted to the image decoding apparatus or may be transmitted to the image decoding apparatus via a network.

As described above, the image encoding apparatus may generate a reconstructed picture (a picture including reconstructed samples and a reconstructed block) based on the reference samples and the residual samples. This is for the image encoding apparatus to derive the same prediction result as that performed by the image decoding apparatus, thereby increasing coding efficiency. Accordingly, the image encoding apparatus may store the reconstructed picture (or the reconstructed samples and the reconstructed block) in a memory and use the same as a reference picture for inter prediction. As described above, an in-loop filtering procedure is further applicable to the reconstructed picture.

FIG. 6 is a flowchart illustrating an inter prediction based video/image decoding method.

Figure 7:
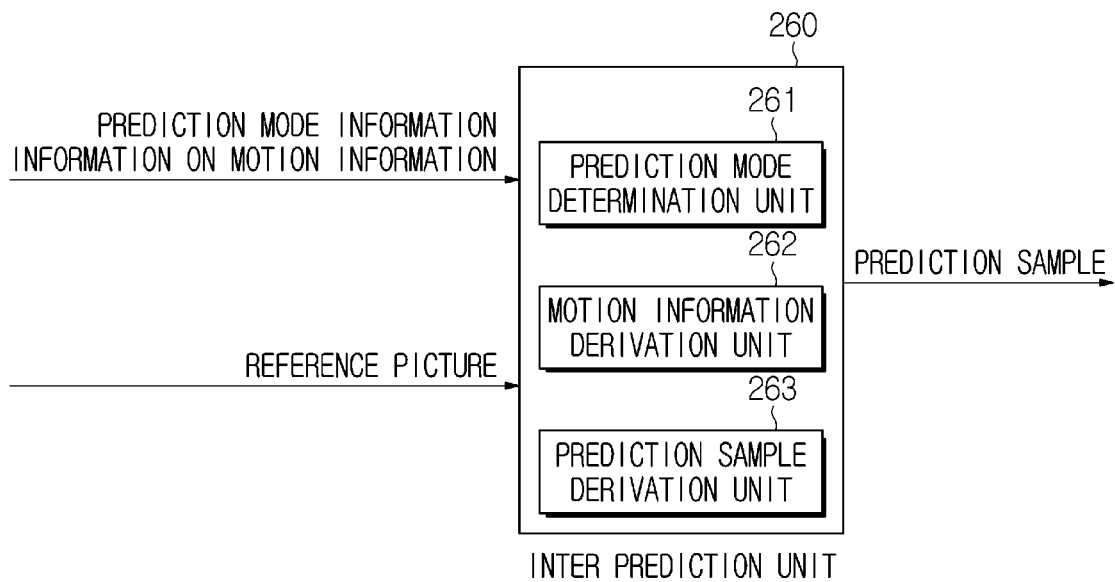
FIG. 7 is a view illustrating the configuration of an inter prediction unit 260 according to the present disclosure.

FIG. 7 is a view illustrating the configuration of an inter prediction unit 260 according to the present disclosure.

The image decoding apparatus may perform operation corresponding to operation performed by the image encoding apparatus. The image decoding apparatus may perform prediction with respect to a current block based on received prediction information and derive prediction samples.

The decoding method of FIG. 6 may be performed by the image decoding apparatus of FIG. 3. Steps S610 to S630 may be performed by the inter prediction unit 260, and the prediction information of step S610 and the residual information of step S640 may be obtained from a bitstream by the entropy decoder 210. The residual processor of the image decoding apparatus may derive residual samples for a current block based on the residual information (S640). Specifically, the dequantizer 220 of the residual processor may perform dequantization based on quantized transform coefficients derived based on the residual information to derive transform coefficients, and the inverse transformer 230 of the residual processor may perform inverse transform with respect to the transform coefficients to derive the residual samples for the current block. Step S650 may be performed by the adder 235 or the reconstructor.

Specifically, the image decoding apparatus may determine the prediction mode of the current block based on the received prediction information (S610). The image decoding apparatus may determine which inter prediction mode applies to the current block based on the prediction mode information in the prediction information.

For example, it may be determined whether the skip mode applies to the current block based on the skip flag. In addition, it may be determined whether the merge mode or the MVP mode applies to the current block based on the merge flag. Alternatively, one of various inter prediction mode candidates may be selected based on the mode index. The inter prediction mode candidates may include a skip mode, a merge mode and/or an MVP mode or may include various inter prediction modes which will be described below.

The image decoding apparatus may derive the motion information of the current block based on the determined inter prediction mode (S620). For example, when the skip mode or the merge mode applies to the current block, the image decoding apparatus may construct a merge candidate list, which will be described below, and select one of merge candidates included in the merge candidate list. The selection may be performed based on the above-described candidate selection information (merge index). The motion information of the current block may be derived using the motion information of the selected merge candidate. For example, the motion information of the selected merge candidate may be used as the motion information of the current block.

As another example, when the MVP mode applies to the current block, the image decoding apparatus may construct an MVP candidate list and use the motion vector of an MVP candidate selected from among MVP candidates included in the MVP candidate list as an MVP of the current block. The selection may be performed based on the above-described candidate selection information (mvp flag or mvp index). In this case, the MVD of the current block may be derived based on information on the MVD, and the motion vector of the current block may be derived based on MVP and MVD of the current block. In addition, the reference picture index of the current block may be derived based on the reference picture index information. A picture indicated by the reference picture index in the reference picture list of the current block may be derived as a reference picture referenced for inter prediction of the current block.

The image decoding apparatus may generate prediction samples of the current block based on motion information of the current block (S630). In this case, the reference picture may be derived based on the reference picture index of the current block, and the prediction samples of the current block may be derived using the samples of the reference block indicated by the motion vector of the current block on the reference picture. In some cases, a prediction sample filtering procedure may be further performed with respect to all or some of the prediction samples of the current block.

For example, as shown in FIG. 7, the inter prediction unit 260 of the image decoding apparatus may include a prediction mode determination unit 261, a motion information derivation unit 262 and a prediction sample derivation unit 263. In the inter prediction unit 260 of the image decoding apparatus, the prediction mode determination unit 261 may determine the prediction mode of the current block based on the received prediction mode information, the motion information derivation unit 262 may derive the motion information (a motion vector and/or a reference picture index, etc.) of the current block based on the received motion information, and the prediction sample derivation unit 263 may derive the prediction samples of the current block.

The image decoding apparatus may generate residual samples of the current block based the received residual information (S640). The image decoding apparatus may generate the reconstructed samples of the current block based on the prediction samples and the residual samples and generate a reconstructed picture based on this (S650). Thereafter, an in-loop filtering procedure is applicable to the reconstructed picture as described above.

As described above, the inter prediction procedure may include step of determining an inter prediction mode, step of deriving motion information according to the determined prediction mode, and step of performing prediction (generating prediction samples) based on the derived motion information. The inter prediction procedure may be performed by the image encoding apparatus and the image decoding apparatus, as described above.

Hereinafter, the step of deriving the motion information according to the prediction mode will be described in greater detail.

As described above, inter prediction may be performed using motion information of a current block. An image encoding apparatus may derive optimal motion information of a current block through a motion estimation procedure. For example, the image encoding apparatus may search for a similar reference block with high correlation within a predetermined search range in the reference picture using an original block in an original picture for the current block in fractional pixel unit, and derive motion information using the same. Similarity of the block may be calculated based on a sum of absolute differences (SAD) between the current block and the reference block. In this case, motion information may be derived based on a reference block with a smallest SAD in the search area. The derived motion information may be signaled to an image decoding apparatus according to various methods based on an inter prediction mode.

When a merge mode applies to a current block, motion information of the current block is not directly transmitted and motion information of the current block is derived using motion information of a neighboring block. Accordingly, motion information of a current prediction block may be indicated by transmitting flag information indicating that the merge mode is used and candidate selection information (e.g., a merge index) indicating which neighboring block is used as a merge candidate. In the present disclosure, since the current block is a unit of prediction performance, the current block may be used as the same meaning as the current prediction block, and the neighboring block may be used as the same meaning as a neighboring prediction block.

The image encoding apparatus may search for merge candidate blocks used to derive the motion information of the current block to perform the merge mode. For example, up to five merge candidate blocks may be used, without being limited thereto. The maximum number of merge candidate blocks may be transmitted in a slice header or a tile group header, without being limited thereto. After finding the merge candidate blocks, the image encoding apparatus may generate a merge candidate list and select a merge candidate block with smallest RD cost as a final merge candidate block.

The present disclosure provides various embodiments for the merge candidate blocks configuring the merge candidate list. The merge candidate list may use, for example, five merge candidate blocks. For example, four spatial merge candidates and one temporal merge candidate may be used.

Figure 8:
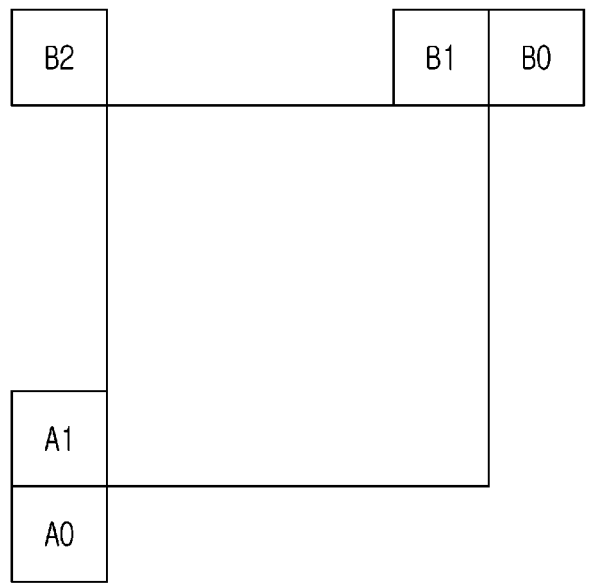
FIG. 8 is a view illustrating neighboring blocks available as a spatial merge candidate.

FIG. 8 is a view illustrating neighboring blocks available as a spatial merge candidate.

Figure 9:
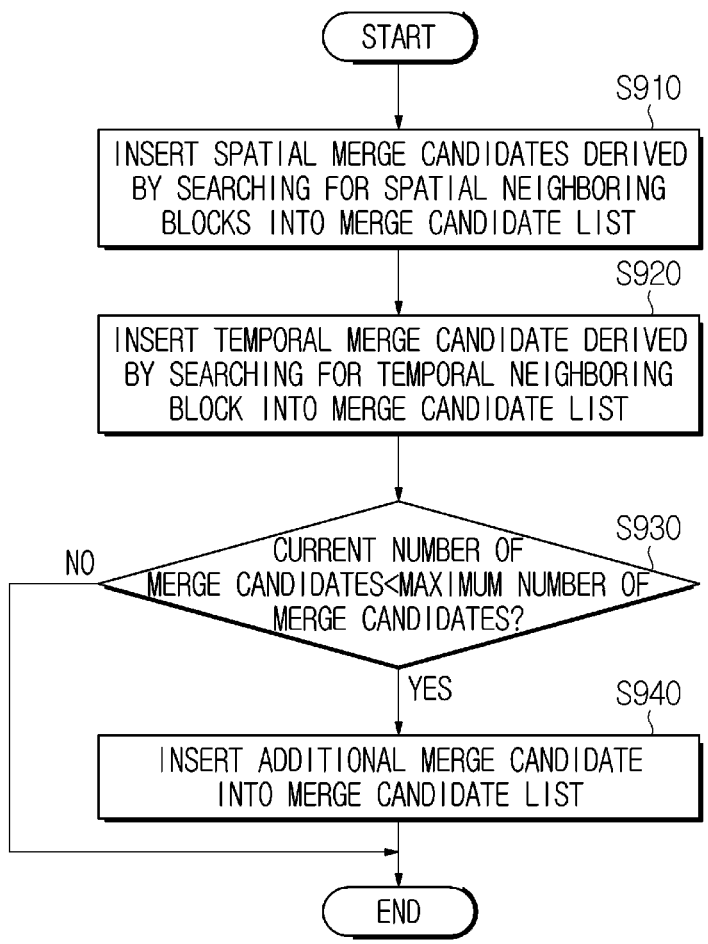
FIG. 9 is a view schematically illustrating a merge candidate list construction method according to an example of the present disclosure.

FIG. 9 is a view schematically illustrating a merge candidate list construction method according to an example of the present disclosure.

An image encoding/decoding apparatus may insert, into a merge candidate list, spatial merge candidates derived by searching for spatial neighboring blocks of a current block (S910). For example, as shown in FIG. 8, the spatial neighboring blocks may include a bottom-left corner neighboring block $A_0$, a left neighboring block $A_1$, a top-right corner neighboring block $B_0$, a top neighboring block $B_1$, and a top-left corner neighboring block $B_2$ of the current block. However, this is an example and, in addition to the above-described spatial neighboring blocks, additional neighboring blocks such as a right neighboring block, a bottom neighboring block and a bottom-right neighboring block may be further used as the spatial neighboring blocks. The image encoding/decoding apparatus may detect available blocks by searching for the spatial neighboring blocks based on priority and derive motion information of the detected blocks as the spatial merge candidates. For example, the image encoding/decoding apparatus may construct a merge candidate list by searching for the five blocks shown in FIG. 8 in order of $A_1$, $B_1$, $B_0$, $A_0$ and $B_2$ and sequentially indexing available candidates.

The image encoding/decoding apparatus may insert, into the merge candidate list, a temporal merge candidate derived by searching for temporal neighboring blocks of the current block (S920). The temporal neighboring blocks may be located on a reference picture which is different from a current picture in which the current block is located. A reference picture in which the temporal neighboring block is located may be referred to as a collocated picture or a col picture. The temporal neighboring block may be searched for in order of a bottom-right corner neighboring block and a bottom-right center block of the co-located block for the current block on the col picture. Meanwhile, when applying motion data compression in order to reduce memory load, specific motion information may be stored as representative motion information for each predetermined storage unit for the col picture. In this case, motion information of all blocks in the predetermined storage unit does not need to be stored, thereby obtaining motion data compression effect. In this case, the predetermined storage unit may be predetermined as, for example, 16×16 sample unit or 8×8 sample unit or size information of the predetermined storage unit may be signaled from the image encoding apparatus to the image decoding apparatus. When applying the motion data compression, the motion information of the temporal neighboring block may be replaced with the representative motion information of the predetermined storage unit in which the temporal neighboring block is located. That is, in this case, from the viewpoint of implementation, the temporal merge candidate may be derived based on the motion information of a prediction block covering an arithmetic left-shifted position after an arithmetic right shift by a predetermined value based on coordinates (top-left sample position) of the temporal neighboring block, not a prediction block located on the coordinates of the temporal neighboring block. For example, when the predetermined storage unit is a $2^n \times 2^n$ sample unit and the coordinates of the temporal neighboring block are (xTnb, yTnb), the motion information of a prediction block located at a modified position ((xTnb>>n)<<n), (yTnb>>n)<<n)) may be used for the temporal merge candidate. Specifically, for example, when the predetermined storage unit is a 16×16 sample unit and the coordinates of the temporal neighboring block are (xTnb, yTnb), the motion information of a prediction block located at a modified position ((xTnb>>4)<<4), (yTnb>>4)<<4)) may be used for the temporal merge candidate. Alternatively, for example, when the predetermined storage unit is an 8×8 sample unit and the coordinates of the temporal neighboring block are (xTnb, yTnb), the motion information of a prediction block located at a modified position ((xTnb>>3)<<3), (yTnb>>3)<<3)) may be used for the temporal merge candidate.

Referring to FIG. 9 again, the image encoding/decoding apparatus may check whether the current number of merge candidates is less than a maximum number of merge candidates (S930). The maximum number of merge candidates may be predefined or signaled from the image encoding apparatus to the image decoding apparatus. For example, the image encoding apparatus may generate and encode information on the maximum number of merge candidates and transmit the encoded information to the image decoding apparatus in the form of a bitstream. When the maximum number of merge candidates is satisfied, a subsequent candidate addition process S940 may not be performed.

When the current number of merge candidates is less than the maximum number of merge candidates as a checked result of step S930, the image encoding/decoding apparatus may derive an additional merge candidate according to a predetermined method and then insert the additional merge candidate to the merge candidate list (S940). The additional merge candidate may include, for example, at least one of history based merge candidate(s), pair-wise average merge candidate(s), ATMVP, combined bi-predictive merge candidate(s) (when a slice/tile group type of a current slice/tile group is a B type) and/or zero vector merge candidate(s).

When the current number of merge candidates is not less than the maximum number of merge candidates as a checked result of step S930, the image encoding/decoding apparatus may end the construction of the merge candidate list. In this case, the image encoding apparatus may select an optimal merge candidate from among the merge candidates configuring the merge candidate list, and signal candidate selection information (e.g., merge candidate index or merge index) indicating the selected merge candidate to the image decoding apparatus. The image decoding apparatus may select the optimal merge candidate based on the merge candidate list and the candidate selection information.

The motion information of the selected merge candidate may be used as the motion information of the current block, and the prediction samples of the current block may be derived based on the motion information of the current block, as described above. The image encoding apparatus may derive the residual samples of the current block based on the prediction samples and signal residual information of the residual samples to the image decoding apparatus. The image decoding apparatus may generate reconstructed samples based on the residual samples derived based on the residual information and the prediction samples and generate the reconstructed picture based on the same, as described above.

When applying a skip mode to the current block, the motion information of the current block may be derived using the same method as the case of applying the merge mode. However, when applying the skip mode, a residual signal for a corresponding block is omitted and thus the prediction samples may be directly used as the reconstructed samples. The above skip mode may apply, for example, when the value of cu_skip_flag is 1.

When applying an MVP mode to the current block, a motion vector predictor (mvp) candidate list may be generated using a motion vector of a reconstructed spatial neighboring block (e.g., the neighboring block shown in FIG. 8) and/or a motion vector corresponding to the temporal neighboring block (or Col block). That is, the motion vector of the reconstructed spatial neighboring blocks and the motion vector corresponding to the temporal neighboring blocks may be used as motion vector predictor candidates of the current block. When applying bi-prediction, an mvp candidate list for L0 motion information derivation and an mvp candidate list for L1 motion information derivation are individually generated and used. Prediction information (or information on prediction) of the current block may include candidate selection information (e.g., an MVP flag or an MVP index) indicating an optimal motion vector predictor candidate selected from among the motion vector predictor candidates included in the mvp candidate list. In this case, a prediction unit may select a motion vector predictor of a current block from among the motion vector predictor candidates included in the mvp candidate list using the candidate selection information. The prediction unit of the image encoding apparatus may obtain and encode a motion vector difference (MVD) between the motion vector of the current block and the motion vector predictor and output the encoded MVD in the form of a bitstream. That is, the MVD may be obtained by subtracting the motion vector predictor from the motion vector of the current block. The prediction unit of the image decoding apparatus may obtain a motion vector difference included in the information on prediction and derive the motion vector of the current block through addition of the motion vector difference and the motion vector predictor. The prediction unit of the image decoding apparatus may obtain or derive a reference picture index indicating a reference picture from the information on prediction.

Figure 10:
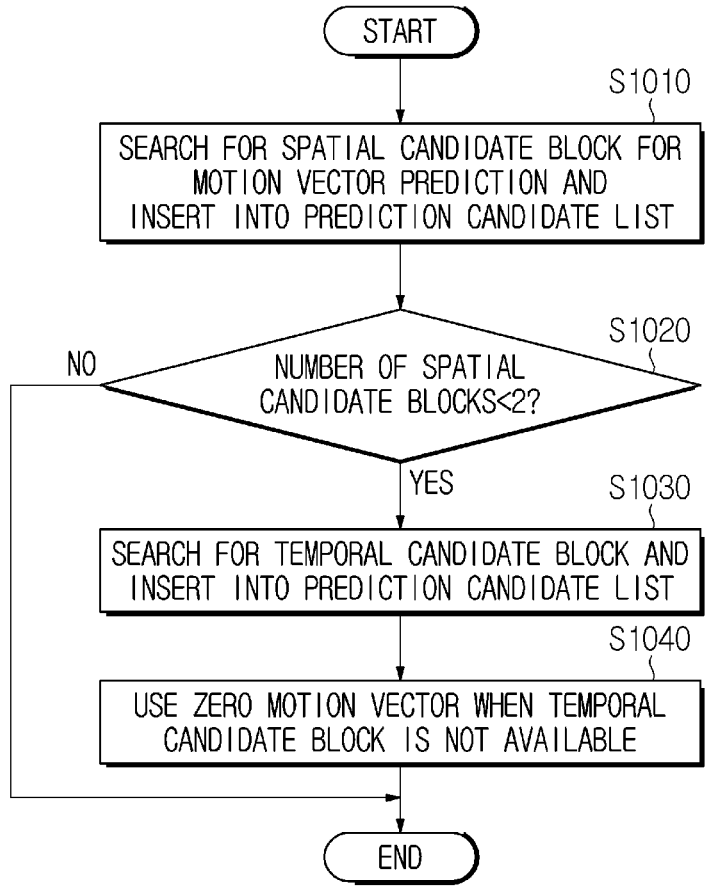
FIG. 10 is a view schematically illustrating a motion vector predictor candidate list configuration method according to an example of the present disclosure.

FIG. 10 is a view schematically illustrating a motion vector predictor candidate list construction 0method according to an example of the present disclosure.

First, a spatial candidate block of a current block may be searched for and available candidate blocks may be inserted into an MVP candidate list (S1010). Thereafter, it is determined whether the number of MVP candidates included in the MVP candidate list is less than 2 (S1020) and, when the number of MVP candidates is two, construction of the MVP candidate list may be completed.

In step S1020, when the number of available spatial candidate blocks is less than 2, a temporal candidate block of the current block may be searched for and available candidate blocks may be inserted into the MVP candidate list (S1030). When the temporal candidate blocks are not available, a zero motion vector may be inserted into the MVP candidate list (S1040), thereby completing construction of the MVP candidate list.

Meanwhile, when applying an mvp mode, a reference picture index may be explicitly signaled. In this case, a reference picture index refidxL0 for L0 prediction and a reference picture index refidxL1 for L1 prediction may be distinguishably signaled. For example, when applying the MVP mode and applying Bi-prediction, both information on refidxL0 and information on refidxL1 may be signaled.

As described above, when applying the MVP mode, information on MVP derived by the image encoding apparatus may be signaled to the image decoding apparatus. Information on the MVD may include, for example, an MVD absolute value and information indicating x and y components for a sign. In this case, when the MVD absolute value is greater than 0, whether the MVD absolute value is greater than 1 and information indicating an MVD remainder may be signaled stepwise. For example, information indicating whether the MVD absolute value is greater than 1 may be signaled only when a value of flag information indicating whether the MVD absolute value is greater than 0 is 1.

Overview of Affine Mode

Hereinafter, an affine mode which is an example of an inter prediction mode will be described in detail. In a conventional video encoding/decoding system, only one motion vector is used to express motion information of a current block. However, in this method, there is a problem in that optimal motion information is only expressed in units of blocks, but optimal motion information cannot be expressed in units of pixels. In order to solve this problem, an affine mode defining motion information of a block in units of pixels has been proposed. According to the affine mode, a motion vector for each pixel and/or subblock unit of a block may be determined using two to four motion vectors associated with a current block.

Compared to the existing motion information expressed using translation motion (or displacement) of a pixel value, in the affine mode, motion information for each pixel may be expressed using at least one of translation motion, scaling, rotation or shear. Among them, an affine mode in which motion information for each pixel is expressed using displacement, scaling or rotation may be similarity or simplified affine mode. The affine mode in the following description may mean a similarity or simplified affine mode.

Motion information in the affine mode may be expressed using two or more control point motion vectors (CPMVs). A motion vector of a specific pixel position of a current block may be derived using a CPMV. In this case, a set of motion vectors for each pixel and/or subblock of a current block may be defined as an affine motion vector field (affine MVF).

Figure 11:
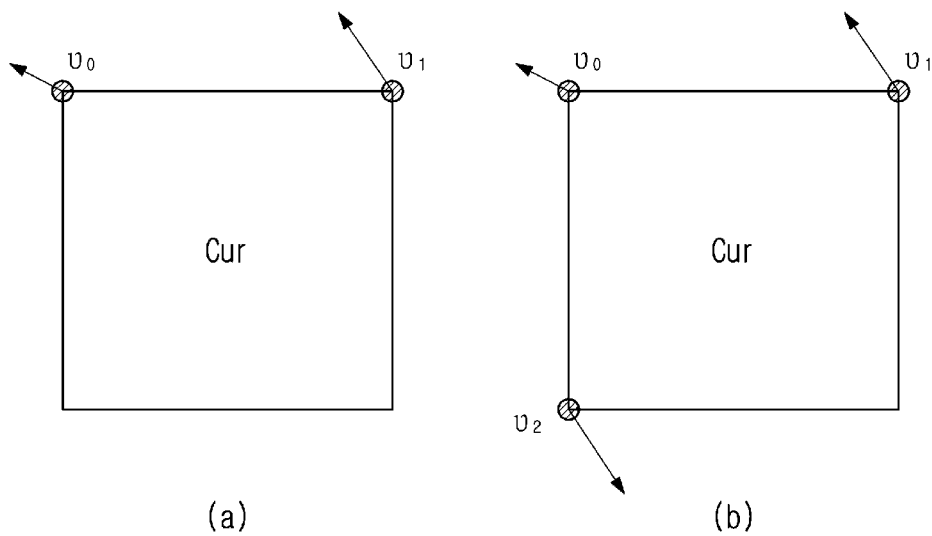
FIG. 11 is a view illustrating a parameter model of an affine mode.

FIG. 11 is a view illustrating a parameter model of an affine mode.

When an affine mode applies to a current block, an affine MVF may be derived using one of a 4-parameter model and a 6-parameter model. In this case, the 4-parameter model may mean a model type in which two CPMVs are used and the 6-parameter model may mean a model type in which three CPMVs are used. FIGS. 11(a) and 11(b) show CPMVs used in the 4-parameter model and the 6-parameter model, respectively.

When the position of the current block is (x, y), a motion vector according to the pixel position may be derived according to Equation 1 or 2 below. For example, the motion vector according to the 4-parameter model may be derived according to Equation 1 and the motion vector according to the 6-parameter model may be derived according to Equation 2.

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1x} - mv_{0x}}{W}y + mv_{0y} \end{cases} \quad [\text{Equation 1}]$$

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad [\text{Equation 2}]$$

In Equations 1 and 2, mv0={mv_0x, mv_0y} may be a CPMV at the top left corner position of the current block, v1={mv_1x, mv_1y} may be a CPMV at the top right position of the current block, and mv2={mv_2x, mv_2y} may be a CPMV at the bottom left position of the current block. In this case, W and H respectively correspond to the width and height of the current block, and my={mv_x, mv_y} may mean a motion vector of a pixel position {x, y}.

In an encoding/decoding process, an affine MVF may be determined in units of pixels and/or predefined subblocks. When the affine MVF is determined in units of pixels, a motion vector may be derived based on each pixel value. Meanwhile, when the affine MVF is determined in units of subblocks, a motion vector of a corresponding block may be derived based on a center pixel value of a subblock. The center pixel value may mean a virtual pixel present in the center of a subblock or a bottom right pixel among four pixels present in the center. In addition, the center pixel value may be a specific pixel in a subblock and may be a pixel representing the subblock. In the present disclosure, the case where the affine MVF is determined in units of 4×4 subblocks will be described. However, this is only for convenience of description and the size of the subblock may be variously changed.

That is, when affine prediction is available, a motion model applicable to a current block may include three models, that is, a translational motion model, a 4-parameter affine motion model and 6-parameter affine motion model. Here, the translational motion model may represent a model used by an existing block unit motion vector, the 4-param- eter affine motion model may represent a model used by two CPMVs, and the 6-parameter affine motion model may represent a model used by three CPMVs. The affine mode may be divided into detailed modes according to a method of encoding/decoding motion information. For example, the affine mode may be subdivided into an affine MVP mode and an affine merge mode.

When an affine merge mode applies for a current block, a CPMV may be derived from neighboring blocks of the current block encoded/decoded in the affine mode. When at least one of the neighboring blocks of the current block is encoded/decoded in the affine mode, the affine merge mode may apply for the current block. That is, when the affine merge mode applies for the current block, CPMVs of the current block may be derived using CPMVs of the neighboring blocks. For example, the CPMVs of the neighboring blocks may be determined to be the CPMVs of the current block or the CPMV of the current block may be derived based on the CPMVs of the neighboring blocks. When the CPMV of the current block is derived based on the CPMVs of the neighboring blocks, at least one of coding parameters of the current block or the neighboring blocks may be used. For example, CPMVs of the neighboring blocks may be modified based on the size of the neighboring blocks and the size of the current block and used as the CPMVs of the current block.

Meanwhile, affine merge in which an MV is derived in units of subblocks may be referred to as a subblock based merge mode, which may be specified by merge_subblock_flag having a second value (e.g., 1). In this case, an affine merging candidate list described below may be referred to as a subblock merging candidate list. In this case, a candidate derived as sbTMVP described below may be further included in the subblock merging candidate list. In this case, the candidate derived as sbTMVP may be used as a candidate of index #0 of the subblock merging candidate list. In other words, the candidate derived as sbTMVP may be located in front of an inherited affine candidates and constructed affine candidates described below in the subblock merging candidate list.

For example, an affine mode flag specifying whether an affine mode is applicable to a current block may be defined, which may be signaled at least one of higher levels of the current block, such as a sequence, a picture, a slice, a tile, a tile group, a brick, etc. For example, the affine mode flag may be named sps_affine_enabled_flag.

When the affine merge mode applies, an affine merge candidate list may be configured to derive the CPMV of the current block. In this case, the affine merge candidate list may include at least one of an inherited affine merge candidate, a constructed affine merge candidate or a zero merge candidate. The inherited affine merge candidate may mean a candidate derived using the CPMVs of the neighboring blocks when the neighboring blocks of the current block are encoded/decoded in the affine mode. The constructed affine merge candidate may mean a candidate having each CPMV derived based on motion vectors of neighboring blocks of each control point (CP). Meanwhile, the zero merge candidate may mean a candidate composed of CPMVs having a size of 0. In the following description, the CP may mean a specific position of a block used to derive a CPMV. For example, the CP may be each vertex position of a block.

Figure 12:
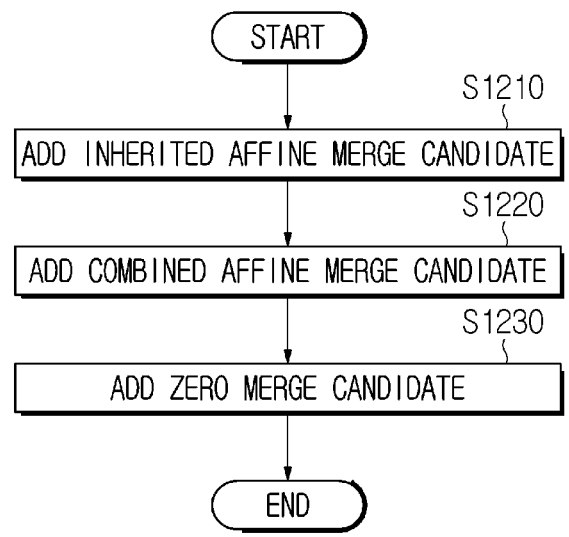
FIG. 12 is a view illustrating a method of generating an affine merge candidate list.

FIG. 12 is a view illustrating a method of generating an affine merge candidate list.

Referring to the flowchart of FIG. 12, affine merge candidates may be added to the affine merge candidate list in order of an inherited affine merge candidate (S1210), a constructed affine merge candidate (S1220) and a zero merge candidate (S1230). The zero merge candidate may be added when the number of candidates included in the candidate list does not satisfy a maximum number of candidates even though all the inherited affine merge candidates and the constructed affine merge candidates are added to the affine merge candidate list. In this case, the zero merge candidate may be added until the number of candidates of the affine merge candidate list satisfies the maximum number of candidates.

Overview of Subblock-Based TMVP (sbTMVP) Mode

Hereinafter, a subblock-based TMVP mode which is an example of an inter prediction mode will be described in detail. According to the subblock-based TMVP mode, a motion vector field (MVF) for a current block may be derived and a motion vector may be derived in units of subblocks.

Unlike a conventional TMVP mode performed in units of coding units, for a coding unit to which subblock-based TMVP mode applies, a motion vector may be encoded/decoded in units of sub-coding units. In addition, according to the conventional TMVP mode, a temporal motion vector may be derived from a collocated block, but, in the subblock-based TMVP mode, a motion vector field may be derived from a reference block specified by a motion vector derived from a neighboring block of the current block. Hereinafter, the motion vector derived from the neighboring block may be referred to as a motion shift or representative motion vector of the current block.

Figure 13:
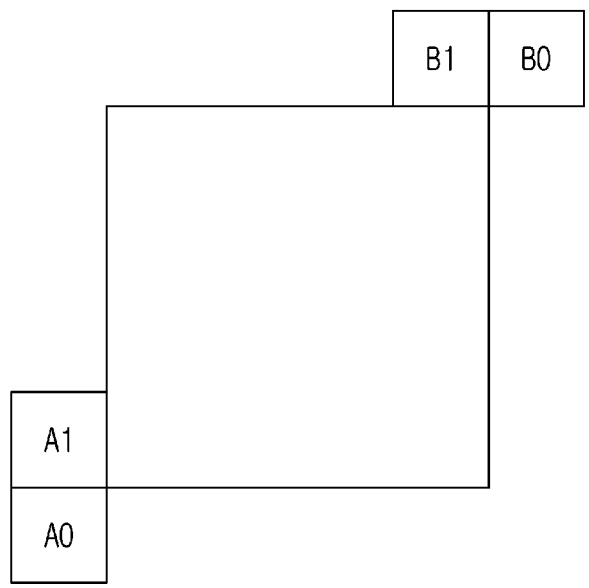
FIG. 13 is a view illustrating a neighboring block of a sub-block based TMVP mode.

FIG. 13 is a view illustrating neighboring blocks of a subblock based TMVP mode.

When a subblock-based TMVP mode applies to a current block, a neighboring block for determining a motion shift may be determined. For example, scan for the neighboring block for determining the motion shift may be performed in order of blocks of A1, B1, B0 and A0 of FIG. 13. As another example, the neighboring block for determining the motion shift may be limited to a specific neighboring block of the current block. For example, the neighboring block for determining the motion shift may always be determined to be a block A1. When a neighboring block has a motion vector referencing a col picture, the corresponding motion vector may be determined to be a motion shift. The motion vector determined to be the motion shift may be referred to as a temporal motion vector. Meanwhile, when the above-described motion vector cannot be derived from neighboring blocks, the motion shift may be set to (0, 0).

FIG. 14 is a view illustrating a method of deriving a motion vector field according to a subblock-based TMVP mode.

Next, a reference block on the collocated picture specified by a motion shift may be determined. For example, subblock based motion information (motion vector or reference picture index) may be obtained from a col picture by adding a motion shift to the coordinates of the current block. In the example shown in FIG. 14, it is assumed that the motion shift is a motion vector of A1 block. By applying the motion shift to the current block, a subblock in a col picture (col subblock) corresponding to each subblock configuring the current block may be specified. Thereafter, using motion information of the corresponding subblock in the col picture (col subblock), motion information of each subblock of the current block may be derived. For example, the motion information of the corresponding subblock may be obtained from the center position of the corresponding subblock. In this case, the center position may be a position of a bottom-right sample among four samples located at the center of the corresponding subblock. When the motion information of a specific subblock of the col block corresponding to the current block is not available, the motion information of a center subblock of the col block may be determined to be motion information of the corresponding subblock. When the motion vector of the corresponding subblock is derived, it may be switched to a reference picture index and a motion vector of a current subblock, similarly to the above-described TMVP process. That is, when a subblock based motion vector is derived, scaling of the motion vector may be performed in consideration of POC of the reference picture of the reference block.

As described above, the subblock-based TMVP candidate for the current block may be derived using the motion vector field or motion information of the current block derived based on the subblock.

Hereinafter, a merge candidate list configured in units of subblocks is defined as a subblock merge candidate list. The above-described affine merge candidate and subblock-based TMVP candidate may be merged to configure a subblock merge candidate list.

Meanwhile, a subblock-based TMVP mode flag specifying whether a subblock-based TMVP mode is applicable to a current block may be defined, which may be signaled at at least one level among higher levels of the current block such as a sequence, a picture, a slice, a tile, a tile group, a brick, etc. For example, the subblock-based TMVP mode flag may be named sps_sbtmvp_enabled_flag. When the subblock-based TMVP mode is applicable to the current block, the subblock-based TMVP candidate may be first added to the subblock merge candidate list and then the affine merge candidate may be added to the subblock merge candidate list. Meanwhile, a maximum number of candidates which may be included in the subblock merge candidate list may be signaled. For example, the maximum number of candidates which may be included in the subblock merge candidate list may be 5.

The size of a subblock used to derive the subblock merge candidate list may be signaled or preset to M×N. For example, M×N may be 8×8. Accordingly, only when the size of the current block is 8×8 or greater, an affine mode or a subblock-based TMVP mode is applicable to the current block.

Triangle Partition for Inter Prediction (TPM)

As an inter prediction mode, a triangle partition for inter prediction (TPM; triangle partition mode) may be used. The TPM may apply to a CU having a size of 8×8 or more. Information specifying whether the TPM is used for a current CU may be, for example, signaled as flag information at a CU level. The TPM may be treated as one mode included in a general merge mode along with a regular merge mode, an MMVD mode, a CIIP mode and a subblock based merge mode.

FIG. 15 is a view illustrating an example in which a current block is partitioned into two triangle partitions by applying a TPM.

As shown in FIG. 15, when applying the TPM, the current block (CU) may be diagonally or inverse-diagonally partitioned into two triangle partitions. Each triangle partition is inter-predicted using each motion and only uni-prediction is allowed for each partition. That is, each triangle partition may have one motion vector and one reference picture index. The reason why only uni-prediction is allowed for each partition is because two motion-compensated prediction blocks are required for each CU as in normal bi-prediction.

Motion information for uni-prediction of the TPM may be derived from the merge candidate list described with reference to FIG. 9. For example, for uni-prediction of the TPM, a uni-prediction candidate list may be derived from the merge candidate list of FIG. 9. When a variable n is an index of a uni-prediction motion candidate included in a uni-prediction candidate list of triangle partition, an LX motion vector (X being equal to a parity of n) of an n-th merge candidate may be used as an n-th uni-prediction motion vector of the TPM. The n-th uni-prediction motion vector of the TPM is denoted by "x" in FIG. 15. In this case, when an LX motion vector of the n-th merge candidate is not present, instead of the LX motion vector, an L(1−X) motion vector of the n-th merge mode may be used as the uni-prediction motion vector of the TPM.

When the TPM is used for the current block, a flag specifying a triangle partition direction (diagonal direction or inverse diagonal direction) and two merge indices (one for each partition) may be signaled. A maximum number of TPM merge candidates may be explicitly signaled at a slice level. In addition, a syntax binarization method for a TPM merge index may be specified according to the maximum number of TPM merge candidates. After prediction is performed on each partition, prediction sample values may be adjusted along a diagonal or inverse diagonal line. Adjustment of the prediction sample values may be performed by a blending process using an adaptive weight. A prediction signal generated by the TPM is for an entire CU (current block), and a transform and quantization process for a residual signal may be performed on the entire CU as in other prediction modes. Finally, a motion field of a CU predicted in the TPM may be stored in units of 4×4 samples. The TPM is not performed along with subblock transform (SBT). That is, when the flag specifying the TPM has a first value (e.g., 1), a flag (e.g., cu_sbt_flag) specifying whether to perform transform in subblock units may be inferred as a second value without being signaled.

After prediction is performed on each triangle partition, the blending process may be performed. The blending process may apply to two prediction signals, thereby deriving samples around a diagonal edge or inverse diagonal edge.

Overview of Intra Block Copy (IBC) Prediction

Hereinafter, IBC prediction according to the present disclosure will be described.

IBC prediction may be performed by a prediction unit of an image encoding/decoding apparatus. IBC prediction may be simply referred to as IBC. The IBC may be used for content image/moving image coding such as screen content coding (SCC). The IBC prediction may be basically performed in the current picture, but may be performed similarly to inter prediction in that a reference block is derived within the current picture. That is, IBC may use at least one of inter prediction techniques described in the present disclosure. For example, IBC may use at least one of the above-described motion information (motion vector) derivation methods. At least one of the inter prediction techniques may be partially modified and used in consideration of the IBC prediction. The IBC may refer to a current picture and thus may be referred to as current picture referencing (CPR).

For IBC, the image encoding apparatus may perform block matching (BM) and derive an optimal block vector (or motion vector) for a current block (or a current CU). The derived block vector may be signaled to the image decoding apparatus through a bitstream using a method similar to signaling of motion information (motion vector) in the above-described inter prediction. The image decoding apparatus may derive a reference block for the current block in the current picture through the signaled block vector, and derive a prediction signal (predicted block or prediction samples) for the current block through this. Here, the block vector may specify displacement from the current block to a reference block located in an already reconstructed area in the current picture. Accordingly, the block vector (or the motion vector) may be referred to a displacement vector. Hereinafter, in IBC, the motion vector may correspond to the block vector or the displacement vector. The motion vector of the current block may include a motion vector (luma motion vector) for a luma component or a motion vector (chroma motion vector) for a chroma component. For example, the luma motion vector for an IBC-coded CU may be an integer sample unit (that is, integer precision). The chroma motion vector may be clipped in integer sample units. As described above, IBC may use at least one of inter prediction techniques, and, for example, the luma motion vector may be encoded/decoded using the above-described merge mode or MVP mode.

When the merge mode is applied to a luma IBC block, a merge candidate list for the luma IBC block may be constructed similarly to the merge candidate list in the inter prediction mode. However, the merge candidate list for the luma IBC block may not include a temporal candidate block, unlike the merge candidate list in the inter prediction mode.

When the MVP mode is applied to the luma IBC block, an mvp candidate list for the luma IBC block may be constructed similarly to the mvp candidate list in the inter prediction mode. However, the merge candidate list for the luma IBC block may not include a temporal candidate block, unlike the mvp candidate list in the inter prediction mode.

In IBC, a reference block is derived from the already reconstructed area in the current picture. In this case, in order to reduce memory consumption and complexity of the image decoding apparatus, only a predefined area among already reconstructed areas in the current picture may be referenced. The predefined area may include a current CTU in which the current block is included. In this way, by restricting referenceable reconstructed area to the predefined area, the IBC mode may be implemented in hardware using a local on-chip memory.

The image encoding apparatus for performing IBC may search the predefined area to determine a reference block with smallest RD cost and derive a motion vector (block vector) based on the positions of the determined reference block and the current block.

Prediction mode information of IBC may be signaled at a CU level. For example, flag information specifying whether an IBC skip/merge mode is applied to the current block and/or flag information specifying whether an IBC AMVP mode is applied to the current block may be signaled through coding_unit syntax.

In the case of the IBC skip/merge mode, a merge candidate index may be signaled to specify a block vector to be used for prediction of the current luma block among block vectors included in the merge candidate list. In this case, the merge candidate list may include IBC-encoded neighboring blocks. As described above, the merge candidate list may include a spatial merge candidate, but may not include a temporal merge candidate. In addition, the merge candidate list may further include history-based motion vector predictor (HMVP) candidates and/or pairwise candidates.

In the case of the IBC MVP mode, a block vector difference may be encoded using the same method as a motion vector difference of the above-described inter prediction mode. In the IBC MVP mode, the block vector prediction method may be performed based on an mvp candidate list including two candidates as predictors, similarly to the MVP mode. One of the two candidates may be derived from a left neighboring block of the current block and the other candidate may be derived from a top neighboring block of the current block. In this case, only when the left neighboring block or the top neighboring block is IBC-encoded, candidates may be derived from the corresponding neighboring block. If the left neighboring block or the top neighboring block is not available (for example, is not IBC-encoded), a predetermined default block vector may be included in the mvp candidate list as a predictor. In addition, in the case of the IBC MVP mode, block vector prediction similar to the MVP mode may be performed in that information (e.g., flag) specifying one of two block vector predictors is signaled as candidate selection information and used for image decoding. The mvp candidate list may include an HMVP candidate and/or a zero motion vector as the default block vector.

The HMVP candidate may be referred to as a history-based MVP candidate, and an MVP candidate used before encoding/decoding of the current block, a merge candidate or a block vector candidate may be stored in an HMVP list as HMVP candidates. Thereafter, when the merge candidate list of the current block or the mvp candidate list does not include a maximum number of candidates, candidates stored in the HMVP list may be added to the merge candidate list or mvp candidate list of the current block as HMVP candidates.

The pairwise candidate may mean a candidate derived by averaging two candidates selected according to a predetermined order from among candidates already included in the merge candidate list of the current block.

Prediction mode information (e.g., pred_mode_ibc_flag) specifying whether IBC is applied for the current block may be signaled at a CU level. For example, pred_mode_ibc_flag may be signaled through coding_unit syntax. In this case, pred_mode_ibc_flag having a first value (e.g., 0) may specify that IBC is not applied for the current block. In contrast, pred_mode_ibc_flag having a second value (e.g., 1) may specify that IBC is applied for the current block.

As described above, when an inter prediction mode is applied to a current block, a prediction block of the current block may be generated based on a predetermined merge candidate list. The inter prediction mode for the current block may be determined to be any one of various inter prediction modes (e.g., a regular merge mode, an affine mode, a subblock-based merge mode, a triangle partition for inter prediction (TPM), an intra block copy (IBC), etc.). In addition, information on a maximum number of merge candidates included in the merge candidate list may be signaled at a picture level.

FIG. 16 is a view illustrating an example of a picture parameter set (PPS) including information on a maximum number of merge candidates.

Referring to FIG. 16, the picture parameter set (PPS) may include syntax elements regarding the maximum number of merge candidates.

For example, the picture parameter set (PPS) may include pps_six_minus_max_num_merge_cand_plus1. ps_six_minus_max_num_merge_cand_plus1 may specify whether a syntax element (e.g., pic_six_minus_max_num_merge_cand) used to derive the maximum number of merge candidates is present in the picture header referencing the picture parameter set (PPS). For example, pps_six_minus_max_num_merge_cand_plus1 having a first value (e.g., 0) may specify that pic_six_minus_max_num_merge_cand is present in the picture header. In contrast, pps_six_minus_max_num_merge_cand_plus1 having a value (e.g., 1) greater than the first value may specify that pic_six_minus_max_num_merge_cand is not present in the picture header. The value of pps_six_minus_max_num_merge_cand_plus1 may be greater than or equal to 0 and may be less than or equal to 6.

In addition, the picture parameter set (PPS) may include pps_max_num_merge_cand_minus_max_num_triangle_cand_plus1. pps_max_num_merge_cand_minus_max_num_triangle_cand_plus1 may specify whether a syntax element (e.g., pic_max_num_merge_cand_minus_max_num_triangle_cand) used to derive the maximum number of TPM merge candidates is present in the picture header of a slice referencing the picture parameter set (PPS). For example, pps_max_num_merge_cand_minus_max_num_triangle_cand_plus1 having a first value (e.g., 0) may specify that pic_max_num_merge_cand_minus_max_num_triangle_cand is present in the picture header. In contrast, pps_max_num_merge_cand_minus_max_num_triangle_cand_plus1 having a value (e.g., 1) greater than the first value may specify that pic_max_num_merge_cand_minus_max_num_triangle_cand is not present in the picture header. The value of pps_max_num_merge_cand_minus_max_num_triangle_cand_plus1 may be greater than or equal to 0 and may be less than or equal to a value obtained by subtracting 1 from pic_max_num_merge_cand_minus_max_num_triangle_cand.

pps_six_minus_max_num_merge_cand_plus1 and pps_max_num_merge_cand_minus_max_num_triangle_cand_plus1 may be signaled based on a predetermined flag (e.g., constant_slice_header_params_enabled_flag). For example, when constant_slice_header_params_enabled_flag has a first value (e.g., 0), pps_six_minus_max_num_merge_cand_plus1 and pps_max_num_merge_cand_minus_max_num_triangle_cand_plus1 may be inferred as a first value (e.g., 0) without being signaled. In contrast, when constant_slice_header_params_enabled_flag has a second value (e.g., 1), pps_six_minus_max_num_merge_cand_plus1 and pps_max_num_merge_cand_minus_max_num_triangle_cand_plus1 may be signaled.

FIG. 17 is a view illustrating an example of a picture header including information on a maximum number of merge candidates.

Referring to FIG. 17, the picture header may include syntax elements regarding whether a TMVP mode is available at a picture level.

For example, the picture header may include pic_temporal_mvp_enabled_flag. pic_temporal_mvp_enabled_flag may specify whether a TMVP mode is available for a current picture referencing the picture header. For example, pic_temporal_mvp_enabled_flag having a first value (e.g., 0) may specify that the TMVP mode is not available for the current picture. In contrast, pic_temporal_mvp_enabled_flag having a second value (e.g., 1) may specify that the TMVP mode is available for the current picture.

When pic_temporal_mvp_enabled_flag may be signaled only when the TMVP mode is available at a sequence level (e.g., sps_temporal_mvp_enabled_flag=1). When pic_temporal_mvp_enabled_flag is not signaled, the value of pic_temporal_mvp_enabled_flag may be inferred as a first value (e.g., 0). Meanwhile, when a reference picture having the same spatial resolution as a current picture is not present in a decoded picture buffer (DPB), the value of pic_temporal_mvp_enabled_flag may be limited to a first value (e.g., 0).

In addition, the picture header may include pic_six_minus_max_num_merge_cand. pic_six_minus_max_num_merge_cand may be used to derive the maximum number of regular merge candidates supported in slices associated with the picture header in a regular merge mode. For example, the maximum number (e.g., MaxNumMergeCand) of regular merge candidates may be derived by subtracting the value of pic_six_minus_max_num_merge_cand from 6. In this case, the maximum number of regular merge candidates may be greater than or equal to 1 and may be less than equal to 6.

pic_six_minus_max_num_merge_cand may be signaled only when pps_six_minus_max_num_merge_cand_plus1 signaled through the picture parameter set (PPS) has a first value (e.g., 0). When pic_six_minus_max_num_merge_cand is not signaled, the value of pic_six_minus_max_num_merge_cand may be inferred as a value obtained by subtracting 1 from the value of pps_six_minus_max_num_merge_cand_plus1.

In addition, the picture header may include pic_five_minus_max_num_subblock_merge_cand. pic_five_minus_max_num_subblock_merge_cand may be used to derive a maximum number of subblock merge candidates supported in slices associated with the picture header in a subblock-based merge mode. For example, the maximum number (e.g., MaxNumSubblockMergeCand) of subblock merge candidates may be derived by subtracting the value of pic_six_minus_max_num_merge_cand from 5. In this case, the maximum number of subblock merge candidates may be greater than or equal to 0 and may be less than or equal to 5.

pic_five_minus_max_num_subblock_merge_cand may be signaled only when an affine mode is available at a sequence level (e.g., sps_affine_enabled_flag==1). When pic_five_minus_max_num_subblock_merge_cand is not signaled, the value of pic_five_minus_max_num_subblock_merge_cand may be inferred as a predetermined value based on a first flag (e.g., sps_sbtmvp_enabled_flag) specifying whether a subblock-based temporal motion vector predictor (TMVP) mode is available at a sequence level and a second flag (e.g., pic_temporal_mvp_enabled_flag) specifying whether a TMVP mode is available at a picture level. For example, the value of pic_five_minus_max_num_subblock_merge_cand may be inferred as a value obtained by subtracting an AND operation result (e.g., 1 or 0) of the first flag and the second flag from 5.

In addition, the picture header may include pic_max_num_merge_cand_minus_max_num_triangle_cand. pic_max_num_merge_cand_minus_max_num_triangle_cand may be used to derive a maximum number of TPM merge candidates supported in slices associated with the picture header in a TPM. For example, the maximum number (e.g., MaxNumTriangleMergeCand) of TPM merge candidates may be derived by subtracting the value of pic_max_num_merge_cand_minus_max_num_triangle_cand from the maximum number (e.g., MaxNumMergeCand) of regular merge candidates. In this case, the maximum number of TPM merge candidates may be greater than or equal to 2 and may be less than or equal to the maximum number of regular merge candidates.

pic_max_num_merge_cand_minus_max_num_triangle_cand may be signaled only when the TPM is available at a sequence level (e.g., sps_triangle_enabled_flag==1), the maximum number of regular merge candidates is greater than or equal to 2 (e.g., MaxNumMergeCand≥2), pps_max_num_merge_cand_minus_max_num_triangle_cand_plus1 signaled through the picture parameter set (PPS) has a first value (e.g., 0).

As the case where pic_max_num_merge_cand_minus_max_num_triangle_cand is not signaled, when the TPM is available at a sequence level (e.g., sps_triangle_enabled_flag==1) and the maximum number of regular merge candidates is greater than or equal to 2 (e.g., MaxNumMergeCand≥2), the value of pic_max_num_merge_cand_minus_max_num_triangle_cand may be inferred as a value obtained by subtracting 1 from the value of pps_max_num_merge_cand_minus_max_num_triangle_cand_plus1 signaled through the picture parameter set (PPS). Alternatively, as the case where pic_max_num_merge_cand_minus_max_num_triangle_cand is not signaled, when the TPM is not available at a sequence level (e.g., sps_triangle_enabled_flag==0) or the maximum number of regular merge candidates is less than 2 (e.g., MaxNumMergeCand<2), the maximum number of regular merge candidates may be set to a first value (e.g., 0). In this case, the TPM may not be available for slices associated with the picture header.

In addition, the picture header may include pic_six_minus_max_num_ibc_merge_cand. pic_six_minus_max_num_ibc_merge_cand may be used to derive the maximum number of IBC merge candidates supported in slices associated with the picture header, in intra block copy (IBC). For example, the maximum number (e.g., MaxNumIbcMergeCand) of IBC merge candidates may be derived by subtracting the value of pic_six_minus_max_num_ibc_merge_cand from 6. In this case, the maximum number of IBC merge candidates may be greater than or equal to 1 and may be less than or equal to 6.

According to the examples described above with reference to FIGS. 16 and 17, in various inter prediction modes such as a regular merge mode, a subblock-based merge mode, etc., information on the maximum number of merge candidates may be signaled through a picture parameter set (PPS) and/or a picture header. However, in an actual system implementation system, there are not many use cases in which the number of merge candidates varies according to the pictures. Accordingly, when information on the maximum number of merge candidates is signaled through the picture parameter set (PPS) and/or the picture header, signaling overhead may unnecessarily increase.

In addition, the information on the maximum number of merge candidates may be signaled through a picture parameter set (PPS) and/or a picture header based on predetermined information (e.g., sps_affine_enabled_flag, sps_sbtmvp_enabled_flag, etc.) signaled at a sequence level. That is, the maximum number of merge candidates may be determined based on a plurality of information signaled sporadically at a sequence level and a picture level and, as a result, tool control for various inter prediction modes may become complicated.

In order to solve such problems, according to embodiments of the present disclosure, information on the maximum number of merge candidates may be integrally signaled through a sequence level, for example, a sequence parameter set (SPS). Therefore, signaling overhead may be reduced and tool control for various inter prediction modes may be made easier.

Hereinafter, embodiments of the present disclosure will be described in detail with reference to the accompanying drawings.

First Embodiment

According to a first embodiment, in various inter prediction modes, information on the maximum number of merge candidates may be integrally defined as syntax having a higher level than a picture level, for example, a sequence parameter set (SPS).

FIG. 18 is a view illustrating an example of a picture parameter set (PPS) according to an embodiment of the present disclosure.

Referring to FIG. 18, the picture parameter set (PPS) may not include information on the maximum number of merge candidates, unlike the picture parameter set (PPS) described above with reference to FIG. 16. For example, the picture parameter set (PPS) may not include pps_six_minus_max_num_merge_cand_plus1 which is a syntax element regarding the maximum number of regular merge candidates and pps_max_num_merge_cand_minus_max_num_triangle_cand_plus1 which is a syntax element regarding the maximum number of TPM merge candidates. Therefore, tool control for the regular merge mode and TPM may be performed independently of the picture parameter set (PPS).

FIG. 19 is a view illustrating an example of a sequence parameter set (SPS) according to an embodiment of the present disclosure.

Referring to FIG. 19, the sequence parameter set (SPS) may include information on a maximum number of merge candidates.

For example, the sequence parameter set (SPS) may include sps_six_minus_max_num_merge_cand. sps_six_minus_max_num_merge_cand may be used to derive a maximum number of regular merge candidates, in a regular merge mode. For example, the maximum number of regular merge candidates may be derived based on sps_six_minus_max_num_merge_cand as shown in Equation 3 below.

$$MaxNumMergeCand=6-sps\_six\_minus\_max\_num\_merge\_cand \quad \text{[Equation 3]}$$

Where, MaxNumMergeCand may mean the maximum number of regular merge candidates. In an example, the value of MaxNumMergeCand may be greater than or equal to 1 and may be less than or equal to 6.

In addition, the sequence parameter set (SPS) may include sps_five_minus_max_num_subblock_merge_cand. sps_five_minus_max_num_subblock_merge_cand may be used to derive a maximum number of subblock merge candidates, in a subblock-based merge mode. For example, the maximum number of subblock merge candidates may be derived based on sps_five_minus_max_num_subblock_merge_cand as shown in Equation 4 below.

$$MaxNumSubblockMergeCand=5-sps\_five\_minus\_max\_num\_subblock\_merge\_cand \quad \text{[Equation 4]}$$

where, MaxNumSubblockMergeCand may mean the maximum number of subblock merge candidates. In an example, the value of MaxNumSubblockMergeCand may be greater than or equal to 0 and may be less than or equal to 5.

sps_five_minus_max_num_subblock_merge_cand may be signaled only when an affine mode is available at a sequence level (e.g., sps_affine_enabled_flag==1). When sps_five_minus_max_num_subblock_merge_cand is not signaled, the value of sps_five_minus_max_num_subblock_merge_cand may be inferred as a predetermined value based on a first flag (e.g., sps_sbtmvp_enabled_flag) specifying whether a subblock-based TMVP mode is available at a sequence level. For example, the value of sps_five_minus_max_num_subblock_merge_cand may be inferred as a value obtained by subtracting the value of the first flag from 5.

In addition, the sequence parameter set (SPS) may include sps_max_num_merge_cand_minus_max_num_triangle_cand. sps_max_num_merge_cand_minus_max_num_triangle_cand may be used to derive a maximum number of TPM merge candidates, in a triangle partition mode (TPM). For example, the maximum number of TPM merge candidates may be derived based on sps_max_num_merge_cand_minus_max_num_triangle_cand as shown in Equation 5 below.

$$MaxNumTriangleMergeCand=MaxNumMergeCand-sps\_max\_num\_merge\_cand\_minus\_max\_num\_triangle\_cand \quad \text{[Equation 5]}$$

where, MaxNumTriangleMergeCand may mean the maximum number of TPM merge candidates, and MaxNumMergeCand may mean the maximum number of regular merge candidates. In an example, the value of MaxNumTriangleMergeCand may be greater than or equal to 2 and may be less than or equal to the maximum number (e.g., MaxNumMergeCand) of regular merge candidates.

sps_max_num_merge_cand_minus_max_num_triangle_cand may be signaled only when the TPM is available at a sequence level (e.g., sps_triangle_enabled_flag==1) and the maximum number of regular merge candidates is greater than or equal to 2 (e.g., MaxNumMergeCand 2). In the case where sps_max_num_merge_cand_minus_max_num_triangle_cand is not signaled, when the TPM is not available at a sequence level (e.g., sps_triangle_enabled_flag==0) or the maximum number of regular merge candidates is less than 2 (e.g., MaxNumMergeCand<2), the maximum number of TPM merge candidates may be set to 0. In this case, the TPM may not be allowed.

In addition, the sequence parameter set (SPS) may include sps_six_minus_max_num_ibc_merge_cand. sps_six_minus_max_num_ibc_merge_cand may be used to derive a maximum of number of IBC merge candidates, in intra block copy (IBC). For example, the maximum number of IBC merge candidates may be derived based on sps_six_minus_max_num_ibc_merge_cand as shown in Equation 6 below.

$$MaxNumIbcMergeCand=6-sps\_six\_minus\_max\_num\_ibc\_merge\_cand \quad \text{[Equation 6]}$$

where, MaxNumIbcMergeCand may mean the maximum number of IBC merge candidates. In an example, the value of MaxNumIbcMergeCand may be greater than or equal to 1 and may be less than or equal to 6.

As the sequence parameter set (SPS) includes information on the maximum number of merge candidates, the picture header referencing the sequence parameter set (SPS) may not include a syntax element (e.g., pic_temporal_mvp_enabled_flag) regarding whether a TMVP mode is available at a picture level and syntax elements (e.g., pic_six_minus_max_num_merge_cand, pic_five_minus_max_num_subblock_merge_cand, pic_max_num_merge_cand_minus_max_num_triangle_cand and pic_six_minus_max_num_ibc_merge_cand) regarding the maximum number of merge candidates, unlike the picture header described above with reference to FIG. 17.

According to the first embodiment described above with reference to FIGS. 18 and 19, in various inter prediction modes, information on the maximum number of merge candidates may be integrally defined in syntax having a higher level than a picture level, for example, a sequence parameter set (SPS). Therefore, compared to the case where the information on the maximum number of merge candidates is signaled through the picture parameter set (PPS) and/or the picture header, signaling overhead may be reduced. In addition, the information on the maximum number of merge candidates may be signaled based on predetermined information (e.g., sps_affine_enabled_flag, sps_sbtmvp_enabled_flag, etc.) in the same higher-level syntax, for example, the sequence parameter set (SPS). Therefore, tool control for various inter prediction modes such as a regular merge mode, a subblock-based merge mode, etc. may be made easier.

Meanwhile, in an example, as pic_temporal_mvp_enabled_flag which is a syntax element specifying whether a TMVP mode is available at a picture level is excluded from a picture header, some of signaling conditions in a slice header may be modified as shown in FIG. 20.

FIG. 20 is a view illustrating an example of a slice header according to an embodiment of the present disclosure.

Referring to FIG. 20, identification information (e.g., collocated_from_l0_flag and collocated_ref_idx) of a collocated picture colPic may be signaled based on whether a TMVP mode is available at a sequence level, regardless of whether a TMVP mode is available at a picture level.

Second Embodiment

According to a second embodiment, information (e.g., sps_six_minus_max_num_merge_cand, sps_five_minus_max_num_subblock_merge_cand, etc.) on the maximum number of merge candidates may be integrally defined in syntax having a higher level than a picture level, for example, a sequence parameter set (SPS), similarly to the first embodiment. Specifically, the picture parameter set (PPS) described above with reference to FIG. 18 and the sequence parameter set (SPS) described above with reference to FIG. 19 are applicable to the second embodiment. However, the second embodiment may be different from the first embodiment in the semantics of some syntax elements and a picture header structure. Hereinafter, the second embodiment will be described in detail focusing on differences from the first embodiment.

FIG. 21 is a view illustrating an example of a picture header according to an embodiment of the present disclosure.

Referring to FIG. 21, a picture header according to an embodiment of the present disclosure may not include syntax elements regarding a maximum number of merge candidates. Specifically, as the sequence parameter set (SPS) includes syntax elements regarding a maximum number of merge candidates, a picture header referencing the sequence parameter set (SPS) may not include syntax elements (e.g., pic_six_minus_max_num_merge_cand, pic_five_minus_max_num_subblock_merge_cand, pic_max_num_merge_cand_minus_max_num_triangle_cand and pic_six_minus_max_num_ibc_merge_cand) regarding the maximum number of merge candidates, unlike the picture header described above with reference to FIG. 17.

However, the picture header may include pic_temporal_mvp_enabled_flag which is a syntax element regarding whether a TMVP mode is available at a picture level. In this regard, the second embodiment may be different from the first embodiment.

pic_temporal_mvp_enabled_flag may specify whether a TMVP mode is available for a current picture referencing the picture header. For example, pic_temporal_mvp_enabled_flag having a first value (e.g., 0) may specify that the TMVP mode is not available for the current picture. In contrast, pic_temporal_mvp_enabled_flag having a second value (e.g., 1) may specify that the TMVP mode is available for the current picture referencing the picture header.

pic_temporal_mvp_enabled_flag may be signaled only when the TMVP mode is available at a sequence level (e.g., sps_temporal_mvp_enabled_flag==1). When pic_temporal_mvp_enabled_flag is not signaled, the value of pic_temporal_mvp_enabled_flag may be inferred as a first value (e.g., 0). Meanwhile, when a reference picture having the same spatial resolution as the current picture is not present in a decoded picture buffer (DPB), the value of pic_temporal_mvp_enabled_flag may be limited to a first value (e.g., 0).

As the picture header includes pic_temporal_mvp_enabled_flag, the semantics of sps_five_minus_max_num_subblock_merge_cand which is a syntax element regarding the subblock-based merge mode in the sequence parameter set (SPS) described above with reference to FIG. 19 may be partially modified as follows.

When sps_five_minus_max_num_subblock_merge_cand is not signaled (e.g., sps_affine_enabled_flag==0), the value of sps_five_minus_max_num_subblock_merge_cand may be inferred as a predetermined value (e.g., 5).

In an example, when sps_five_minus_max_num_subblock_merge_cand is inferred as a predetermined value (e.g., 5), a variable IsInfered may be set to true. In addition, the maximum number of subblock merge candidates derived based on Equation 4 above may be updated based on pic_temporal_mvp_enabled_flag and IsInfered as shown in Equation 7 below.

MaxNumSubblockMergeCand=(IsInfered
&&(sps_sbtmvp_enabled_flag && pic_temporal_mvp_enabled_flag))?1:MaxNumSubblockMergeCand      [Equation 7]

where, MaxNumSubblockMergeCand may mean the maximum number of subblock merge candidates. In an example, the value of MaxNumSubblockMergeCand may be greater than or equal to 0 and may be less than or equal to 5.

Referring to Equation 7, when IsInfered is true and an AND operation result of sps_sbtmvp_enabled_flag and pic_temporal_mvp_enabled_flag is true, the value of MaxNumSubblockMergeCand may be updated to a predetermined value (e.g., 1). In contrast, when at least one of IsInfered or the AND operation result of sps_sbtmvp_enabled_flag and pic_temporal_mvp_enabled_flag is false, the value of MaxNumSubblockMergeCand may not be updated. Meanwhile, Equation 7 may be defined at a picture header as the semantics of pic_temporal_mvp_enabled_flag or may be defined at a sequence parameter set (SPS) as the semantics of sps_five_minus_max_num_subblock_merge_cand.

In another example, when sps_five_minus_max_num_subblock_merge_cand is inferred as a predetermined value (e.g., 5), a variable IsInfered may be set to true. In addition, the maximum number of subblock merge candidates may be derived based on sps_five_minus_max_num_subblock_merge_cand, pic_temporal_mvp_enabled_flag and IsInfered as shown in Equation 8 below. That is, Equation 4 above may be replaced with Equation 8.

MaxNumSubblockMergeCand=5−sps_five_minus_max_num_subblock_merge_cand+
(IsInfered &&(sps_sbtmvp_enabled_flag && pic_temporal_mvp_enabled_flag))?1:0      [Equation 8]

where, MaxNumSubblockMergeCand may mean the maximum number of subblock merge candidates. In an example, the value of MaxNumSubblockMergeCand may be greater than or equal to 0 and may be less than or equal to 5.

Referring to Equation 8, when IsInfered is true and an AND operation result of sps_sbtmvp_enabled_flag and pic_temporal_mvp_enabled_flag is true, the value of Max-NumSubblockMergeCand may be derived by adding 1 to a value obtained by subtracting the value of sps_five_minus_max_num_subblock_merge_cand from 5. In contrast, when at least one of IsInfered or the AND operation result of sps_sbtmvp_enabled_flag and pic_temporal_mvp_enabled_flag is false, the value of MaxNumSubblockMergeCand may be derived by subtracting the value of sps_five_minus_max_num_subblock_merge_cand from 5. Meanwhile, Equation 8 may be defined at a picture header as the semantics of pic_temporal_mvp_enabled_flag or may be defined at a sequence parameter set (SPS) as the semantics of sps_five_minus_max_num_subblock_merge_cand.

In another example, a reference value used to derive the maximum number of subblock merge candidates may be changed from 5 to 4. Therefore, the name of sps_five_minus_max_num_subblock_merge_cand may also be changed to sps_four_minus_max_num_subblock_merge_cand.

When sps_four_minus_max_num_subblock_merge_cand is not signaled (e.g., sps_affine_enabled_flag==0), the value of sps_four_minus_max_num_subblock_merge_cand may be inferred as a predetermined value (e.g., 4), regardless of whether a subblock-based TMVP mode is available at a sequence level. In addition, Equations 4 and 7 above may be replaced with Equations 9 and 10 below, respectively.

MaxNumSubblockMergeCand=4−sps_four_minus_max_num_subblock_merge_cand     [Equation 9]

MaxNumSubblockMergeCand+=(sps_sbtmvp_enabled_flag && pic_temporal_mvp_enabled_flag))?1:0     [Equation 10]

where, MaxNumSubblockMergeCand may mean the maximum number of subblock merge candidates.

Referring to Equations 9 and 10 together, the value of MaxNumSubblockMergeCand may be derived by subtracting the value of sps_four_minus_max_num_subblock_merge_cand from 4. In addition, the value of MaxNumSubblockMergeCand may be updated based on an AND operation result of sps_sbtmvp_enabled_flag and pic_temporal_mvp_enabled_flag. For example, when the AND operation result of sps_sbtmvp_enabled_flag and pic_temporal_mvp_enabled_flag is true, the value of MaxNumSubblockMergeCand may increase by 1. In contrast, when the AND operation result of sps_sbtmvp_enabled_flag and pic_temporal_mvp_enabled_flag is false, the value of MaxNumSubblockMergeCand may not be updated. Meanwhile, Equation 10 may be defined at a picture header as the semantics of pic_temporal_mvp_enabled_flag or may be defined at a sequence parameter set (SPS) as the semantics of sps_four_minus_max_num_subblock_merge_cand.

According to the second embodiment described above with reference to FIG. 21, in various inter prediction modes, information on the maximum number of merge candidates may be integrally defined in syntax having a higher level than a picture level, for example, a sequence parameter set (SPS). Therefore, compared to the case where the information on the maximum number of merge candidates is signaled through the picture parameter set (PPS) and/or the picture header, signaling overhead may be reduced. In addition, the information on the maximum number of merge candidates may be signaled based on predetermined information (e.g., sps_affine_enabled_flag, sps_sbtmvp_enabled_flag, etc.) in the same higher-level syntax, for example, the sequence parameter set (SPS). Therefore, tool control for various inter prediction modes such as a regular merge mode, a subblock-based merge mode, etc. may be made easier.

Hereinafter, an image encoding/decoding method according to an embodiment of the present disclosure will be described in detail with reference to FIGS. 22 and 23.

Figure 22:
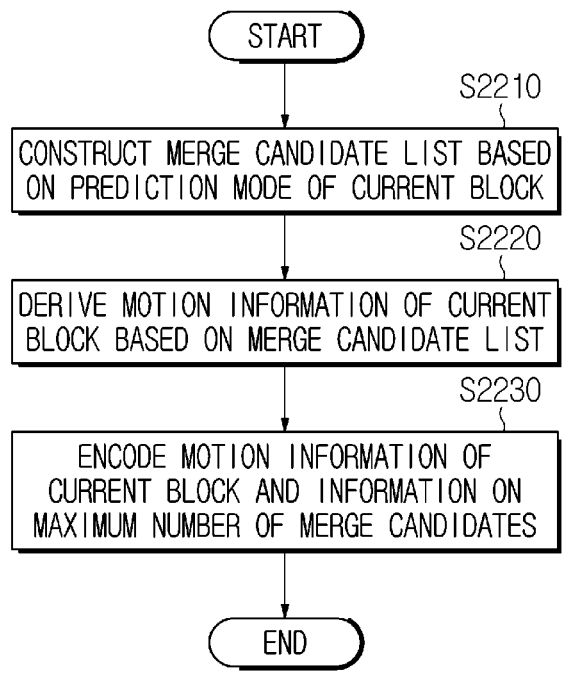
FIG. 22 is a flowchart illustrating an image encoding method according to an embodiment of the present disclosure.

FIG. 22 is a flowchart illustrating an image encoding method according to an embodiment of the present disclosure.

The image encoding method of FIG. 22 may be performed by the image encoding apparatus of FIG. 2. For example, steps S2210 and 2220 may be performed by the inter prediction unit 180. In addition, step S2230 may be performed by the entropy encoding unit 190.

Referring to FIG. 22, when an inter prediction mode is applied to a current block, the image encoding apparatus may construct a merge candidate list for the current block based on a prediction mode of the current block (S2210).

Specifically, the prediction mode of the current block may be determined to be any one of various inter prediction modes (e.g., a regular merge mode, a subblock-based merge mode, a triangle partition for inter prediction (TPM) or an intra block copy (IBC), etc.).

The image encoding apparatus may derive merge candidates based on the prediction mode of the current block and construct a merge candidate list using the derived merge candidates. Here, the merge candidates may be derived from neighboring blocks of the current block, for example, a spatial neighboring block and/or a temporal neighboring block. The merge candidates may be variously referred to as a regular merge candidate, a subblock merge candidate, a TPM merge candidate, etc. according to the prediction mode of the current block.

The image encoding apparatus may insert an additional merge candidate into the merge candidate list until the number of merge candidates included in the merge candidate list reaches a predetermined maximum number. Here, the additional merge candidate may include, for example, at least one of history based merge candidate(s), pair-wise average merge candidate(s), ATMVP, combined bi-predictive merge candidate(s) (when the slice/tile group type of a current slice/tile group is a B type) and/or a zero vector merge candidate. In addition, when the number of merge candidates included in the merge candidate list is greater than or equal to a predetermined maximum number, the image encoding apparatus may finish construction of the merge candidate list.

The image encoding apparatus may derive motion information of the current block based on the constructed merge candidate list (S2220). Specifically, the image encoding apparatus may select an optimal merge candidate from among the merge candidates included in the merge candidate list based on RD cost and derive motion information of the selected merge candidate as the motion information of the current block. In this case, the image encoding apparatus may generate a prediction block of the current block, by performing inter prediction based on the derived motion information.

The image encoding apparatus may encode the motion information of the current block and information on a maximum number of merge candidates (S2230). Here, the motion information of the current block may include candidate selection information (e.g., merge index) specifying the selected merge candidate. In addition, the information on the maximum number of merge candidates may include information on each inter prediction mode and may be used to derive the maximum number of merge candidates.

According to embodiments of the present disclosure, the information on the maximum number of merge candidates may be integrally encoded in syntax having a higher level than the picture level, for example, a sequence parameter set (SPS). For example, the sequence parameter set (SPS) may include sps_six_minus_max_num_merge_cand which is information on a maximum number of merge candidates for a regular merge mode. In addition, the sequence parameter set (SPS) may include sps_five_minus_max_num_subblock_merge_cand which is information on a maximum number of merge candidates for a subblock-based merge mode. In addition, the sequence parameter set (SPS) may include sps_max_num_merge_cand_minus_max_num_triangle_cand which is information on a maximum number of merge candidates for a TPM. In addition, the sequence parameter set (SPS) may include sps_six_minus_max_num_ibc_merge_cand which is information on a maximum number of merge candidates for IBC. An example of the sequence parameter set (SPS) was described above with reference to FIG. 19. Meanwhile, although the information on the maximum number of merge candidates is shown as being included only in the sequence parameter set in FIG. 19, this may be variously modified according to embodiments. For example, some of sps_six_minus_max_num_merge_cand, sps_five_minus_max_num_subblock_merge_cand, sps_max_num_merge_cand_minus_max_num_triangle_cand and sps_six_minus_max_num_ibc_merge_cand described above may be included in the picture header as described above with reference to FIG. 17.

Meanwhile, in the subblock-based merge mode, the maximum number of merge candidates may be determined based on whether an affine mode is available for the current block. Specifically, when the affine mode is available (e.g., sps_affine_enabled_flag==1), the maximum number of merge candidates may be determined to be a value obtained by subtracting the value of sps_five_minus_max_num_subblock_merge_cand from 5. In contrast, when the affine mode is not available (e.g., sps_affine_enabled_flag==0), the maximum number of merge candidates may be determined based on whether a subblock-based temporal motion vector predictor (TMVP) mode is available for the current block (e.g., sps_sbtmvp_enabled_flag) and whether a temporal motion vector predictor (TMVP) mode is available for the current block (e.g., pic_temporal_mvp_enabled_flag). For example, when at least one of the subblock-based TMVP mode or the TMVP mode is not available, the maximum number of merge candidates may be determined to be a first value (e.g., 0). In contrast, when both the subblock-based TMVP mode and the TMVP mode are available, the maximum number of merge candidate may be determined to be a second value (e.g., 1). In this way, in the subblock-based merge mode, the information on the maximum number of merge candidates may be signaled at a sequence level, but the maximum number of merge candidates may be determined at a picture level as whether the TMVP mode is available at the picture level is considered together.

According to an embodiment of the present disclosure, as the information on the maximum number of merge candidates is integrally encoded in syntax having a higher level than the picture level, for example, a sequence parameter set (SPS), signaling overhead may be further reduced.

Figure 23:
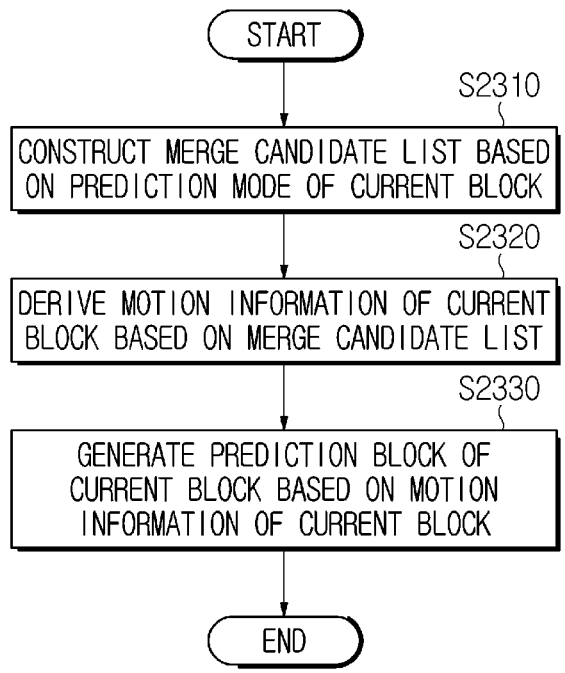
FIG. 23 is a flowchart illustrating an image decoding method according to an embodiment of the present disclosure.

FIG. 23 is a flowchart illustrating an image decoding method according to an embodiment of the present disclosure.

The image decoding method of FIG. 23 may be performed by the image decoding apparatus of FIG. 23. For example, steps S2310 to S2330 may be performed by the inter prediction unit 260.

Referring to FIG. 23, when an inter prediction mode is applied to a current block, the image decoding apparatus may construct a merge candidate list for a current block based on a prediction mode of the current block (S2310).

Specifically, the image decoding apparatus may derive merge candidates based on the prediction mode of the current block and construct a merge candidate list using the derived merge candidates. Here, the merge candidates may be derived from neighboring blocks of the current block, for example, a spatial neighboring block and/or a temporal neighboring block. In addition, when the number of merge candidates included in the merge candidate list is greater than or equal to a predetermined maximum number, the image decoding apparatus may finish construction of the merge candidate list.

According to embodiments of the present disclosure, the maximum number of merge candidates may be determined based on information on the maximum number of merge candidates obtained through syntax having a higher level than the picture level, for example, a sequence parameter set (SPS). For example, the sequence parameter set (SPS) may include sps_six_minus_max_num_merge_cand which is information on a maximum number of merge candidates for a regular merge mode. In addition, the sequence parameter set (SPS) may include sps_five_minus_max_num_subblock_merge_cand which is information on a maximum number of merge candidates for a subblock-based merge mode. In addition, the sequence parameter set (SPS) may include sps_max_num_merge_cand_minus_max_num_triangle_cand which is information on a maximum number of merge candidates for a TPM. In addition, the sequence parameter set (SPS) may include sps_six_minus_max_num_ibc_merge_cand which is information on a maximum number of merge candidates for IBC. An example of the sequence parameter set (SPS) was described above with reference to FIG. 19. Meanwhile, although the information on the maximum number of merge candidates is shown as being included only in the sequence parameter set in FIG. 19, this may be variously modified according to embodiments. For example, some of sps_six_minus_max_num_merge_cand, sps_five_minus_max_num_subblock_merge_cand, sps_max_num_merge_cand_minus_max_num_triangle_cand and sps_six_minus_max_num_ibc_merge_cand described above may be included in the picture header as described above with reference to FIG. 17.

Meanwhile, in the subblock-based merge mode, the maximum number of merge candidates may be determined based on whether an affine mode is available for the current block. Specifically, when the affine mode is available (e.g., sps_affine_enabled_flag==1), the maximum number of merge candidates may be determined based on information on the maximum number of merge candidates obtained through a sequence parameter set (e.g., sps_five_minus_max_num_subblock_merge_cand). For example, the maximum number of merge candidates may be determined to be a value obtained by subtracting the value of sps_five_minus_max_num_subblock_merge_cand from 5. In contrast, when the affine mode is not available (e.g., sps_affine_enabled_flag==0), the maximum number of merge candidates may be determined based on whether a subblock-based temporal motion vector predictor (TMVP) mode is available for the current block and whether a temporal motion vector predictor (TMVP) mode is available for the current block. For example, when at least one of the subblock-based TMVP mode or the TMVP mode is not available, the maximum number of merge candidates may be determined to be a first value (e.g., 0). In contrast, when both the subblock-based TMVP mode and the TMVP mode are available, the maximum number of merge candidate may be determined to be a second value (e.g., 1).

Whether the subblock-based TMVP mode is available for the current block may be determined based on a predetermined first flag (e.g., sps_sbtmvp_enabled_flag) obtained through a sequence parameter set. For example, when sps_sbtmvp_enabled_flag has a first value (e.g., 0), the subblock-based TMVP mode may not be available. In contrast, when sps_sbtmvp_enabled_flag has a second value (e.g., 1), the subblock-based TMVP mode may be available. Whether the TMVP mode is available for the current block may be determined based on a predetermined second flag (e.g., pic_temporal_mvp_enabled_flag) obtained through a picture header. For example, when pic_temporal_mvp_enabled_flag has a first value (e.g., 0), the TMVP mode may not be available. In contrast, when pic_temporal_mvp_enabled_flag has a second value (e.g., 1), the TMVP mode may be available. In this way, in the subblock-based merge mode, the information on the maximum number of merge candidates may be signaled at a sequence level, but the maximum number of merge candidates may be determined at a picture level as whether the TMVP mode is available at the picture level is considered together In an example, when the affine mode is available in the subblock-based merge mode, the maximum number of merge candidates may have a predetermined range based on whether a subblock-based TMVP mode is available.

Specifically, sps_five_minus_max_num_subblock_merge_cand may have a range from 0 to '5−sps_sbtmvp_enabled_flag', inclusive. Accordingly, when the subblock-based TMVP mode is available (e.g., sps_sbtmvp_enabled_flag==1), sps_five_minus_max_num_subblock_merge_cand may have a range from 0 to 4, inclusive. In contrast, when the subblock-based TMVP mode is not available (e.g., sps_sbtmvp_enabled_flag==0), sps_five_minus_max_num_subblock_merge_cand may have a range from 0 to 5, inclusive. Meanwhile, when the affine mode is available (e.g., sps_affine_enabled_flag==1), the maximum number of merge candidates may be '5−sps_five_minus_max_num_subblock_merge_cand'. Accordingly, as the case where the affine mode is available in the subblock-based merge candidate (e.g., sps_affine_enabled_flag==1), when the subblock-based TMVP mode is available (e.g., sps_sbtmvp_enabled_flag==1), the maximum number of merge candidates may have a range from 0 to 5, inclusive. In contrast, as the case where the affine mode is available in the subblock-based merge mode (e.g., sps_affine_enabled_flag==1), when the subblock-based TMVP mode is not available (e.g., sps_sbtmvp_enabled_flag==0), the maximum number of merge candidates may have a range from 0 to 5, inclusive.

Continuing to referring to FIG. 23, the image decoding apparatus may derive motion information of the current block based on the constructed merge candidate list (S2320). Specifically, the image decoding apparatus may select at least one of merge candidate from among the merge candidates included in the merge candidate list based on candidate selection information (e.g., merge index) obtained from a bitstream. In addition, the image decoding apparatus may derive motion information of the selected merge candidate as motion information of the current block.

The image decoding apparatus may generate a prediction block of the current block, by performing inter prediction based on the derived motion information (S2330). The current block may be reconstructed based on the generated prediction block as described above.

According to an embodiment of the present disclosure, as various information for determining the maximum number of merge candidates is integrated into syntax having a higher level than the picture level, for example, a sequence parameter set (SPS), tool control for various inter prediction modes may be made easier.

The name of the syntax element described in the present disclosure may include information on a location where the corresponding syntax element is signaled. For example, a syntax element starting with "sps_" may mean that the corresponding syntax element is signaled at a sequence parameter set (SPS). In addition, a syntax element starting with "pps_", "ph_", "sh_", etc. may mean that the corresponding syntax element is signaled at a picture parameter set (PPS), a picture header, a slice header, etc.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 24:
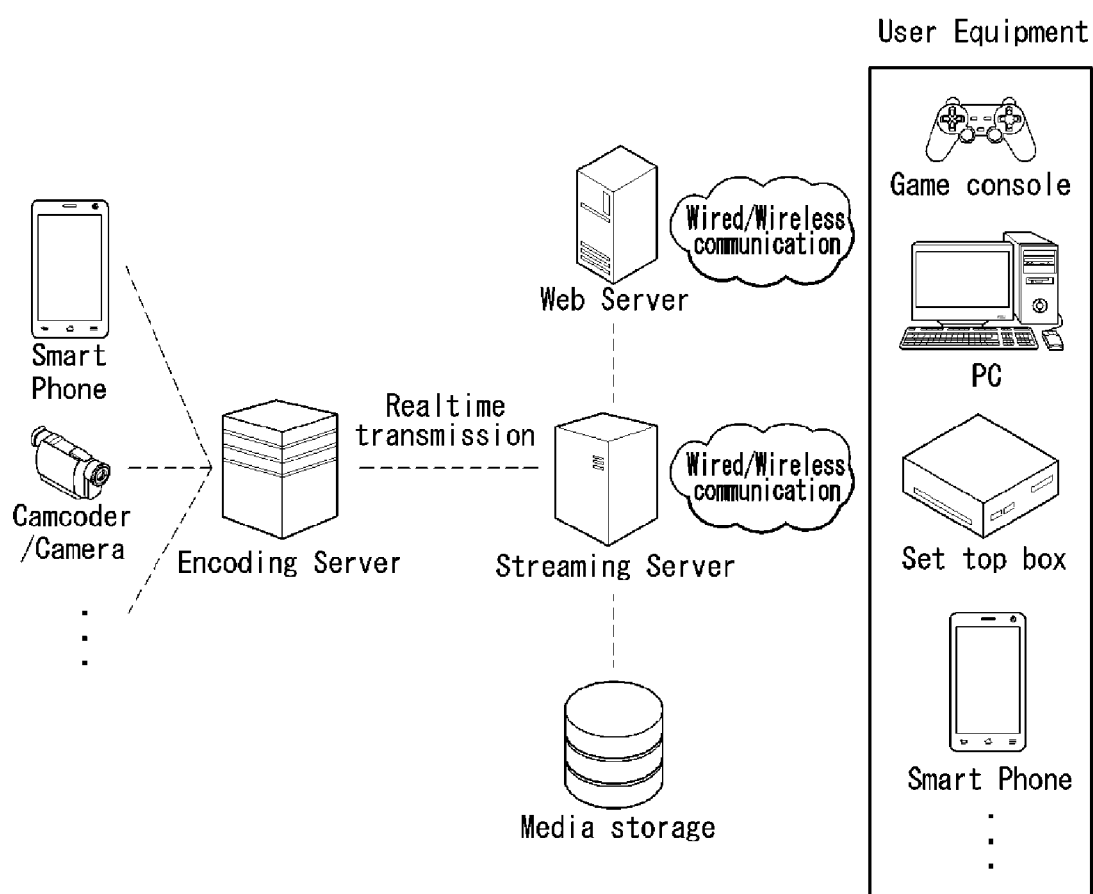
FIG. 24 is a view showing a content streaming system, to which an embodiment of the present disclosure is applicable.

FIG. 24 is a view showing a content streaming system, to which an embodiment of the present disclosure is applicable.

As shown in FIG. 24, the content streaming system, to which the embodiment of the present disclosure is applied, may largely include an encoding server, a streaming server, a web server, a media storage, a user device, and a multimedia input device.

The encoding server compresses contents input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive contents from a media storage and/or an encoding server. For example, when the contents are received from the encoding server, the contents may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:

constructing a candidate list for a current block based on a prediction mode of the current block;
deriving motion information of the current block based on the candidate list; and
generating a prediction block of the current block based on the motion information,
wherein information on a maximum number of candidates included in the candidate list includes information on a maximum number of subblock merge candidates, information on a maximum number of merge candidates, information on a maximum number of IBC (intra block copy) candidates and information on a maximum number of GPM (geometric partitioning mode) candidates,
wherein, based on the prediction mode being a subblock-based merge mode, the maximum number of subblock merge candidates is determined based on whether an affine mode is available for the current block,
wherein, based on the prediction mode being the subblock-based merge mode and the affine mode being available, the maximum number of subblock merge candidates is determined based on the information on the maximum number of subblock merge candidates,
wherein, based on the prediction mode being the subblock-based merge mode and the affine mode not being available, the maximum number of subblock merge candidates is determined as 1 based on a subblock-based temporal motion vector predictor (TMVP) mode being available for the current block and a temporal motion vector predictor (TMVP) mode being available for the current block,
wherein, based on the prediction mode being the subblock-based merge mode and the affine mode not being available, the maximum number of subblock merge candidates is determined as 0 based on one of the subblock-based TMVP mode and the TMVP mode not being available for the current block,
wherein whether the subblock-based TMVP mode is available or not is determined based on a first flag obtained through the sequence parameter set,
wherein whether the TMVP mode is available or not is determined based on a second flag obtained through a picture header,
wherein the information on the maximum number of the candidates included in the candidate list is obtained through a sequence parameter set, and
wherein, in response to the subblock-based TMVP mode being available, a value of the information on the maximum number of subblock merge candidates has a range from 0 to 4 and the maximum number of subblock merge candidates have a range from 1 to 5.

2. An image encoding method performed by an image encoding apparatus, the image encoding method comprising:

constructing a candidate list for a current block based on a prediction mode of the current block;
deriving motion information of the current block based on the candidate list; and
encoding the motion information and information on a maximum number of candidates included in the candidate list,
wherein the information on the maximum number of the candidates included in the candidate list includes information on a maximum number of subblock merge candidates, information on a maximum number of merge candidates, information on a maximum number of IBC (intra block copy) candidates and information on a maximum number of GPM (geometric partitioning mode) candidates, wherein, based on the prediction mode being a subblock-based merge mode, the maximum number of subblock merge candidates is determined based on whether an affine mode is available for the current block, wherein, based on the prediction mode being the sub-block-based merge mode and the affine mode being available, the maximum number of subblock merge candidates is determined based on the information on the maximum number of subblock merge candidates, wherein, based on the prediction mode being the sub-block-based merge mode and the affine mode not being available, the maximum number of subblock merge candidates is determined as 1 based on a subblock-based temporal motion vector predictor (TMVP) mode being available for the current block and a temporal motion vector predictor (TMVP) mode being available for the current block, wherein, based on the prediction mode being the sub-block-based merge mode and the affine mode not being available, the maximum number of subblock merge candidates is determined as 0 based on one of the subblock-based TMVP mode and the TMVP mode not being available for the current block, wherein a first flag specifying whether the subblock-based TMVP mode is available or not is encoded in the sequence parameter set, wherein a second flag specifying whether the TMVP mode is available or not is encoded in a picture header, wherein the information on the maximum number of the candidates included in the candidate list is obtained through a sequence parameter set, and wherein, in response to the subblock-based TMVP mode being available, a value of the information on the maximum number of subblock merge candidates has a range from 0 to 4 and the maximum number of subblock merge candidates have a range from 1 to 5.

3. A method for transmitting a bitstream generated by an image encoding method, the image encoding method comprising:

constructing a candidate list for a current block based on a prediction mode of the current block;

deriving motion information of the current block based on the candidate list; and encoding the motion information and information on a maximum number of candidates included in the candidate list, wherein the information on the maximum number of the candidates included in the candidate list includes information on a maximum number of subblock merge candidates, information on a maximum number of merge candidates, information on a maximum number of IBC (intra block copy) candidates and information on a maximum number of GPM (geometric partitioning mode) candidates, wherein, based on the prediction mode being a subblock-based merge mode, the maximum number of subblock merge candidates is determined based on whether an affine mode is available for the current block, wherein, based on the prediction mode being the sub-block-based merge mode and the affine mode being available, the maximum number of subblock merge candidates is determined based on the information on the maximum number of subblock merge candidates, wherein, based on the prediction mode being the sub-block-based merge mode and the affine mode not being available, the maximum number of subblock merge candidates is determined as 1 based on a subblock-based temporal motion vector predictor (TMVP) mode being available for the current block and a temporal motion vector predictor (TMVP) mode being available for the current block, wherein, based on the prediction mode being the sub-block-based merge mode and the affine mode not being available, the maximum number of subblock merge candidates is determined as 0 based on one of the subblock-based TMVP mode and the TMVP mode not being available for the current block, wherein a first flag specifying whether the subblock-based TMVP mode is available or not is encoded in the sequence parameter set, wherein a second flag specifying whether the TMVP mode is available or not is encoded in a picture header, wherein the information on the maximum number of the candidates included in the candidate list is obtained through a sequence parameter set, and wherein, in response to the subblock-based TMVP mode being available, a value of the information on the maximum number of subblock merge candidates has a range from 0 to 4 and the maximum number of subblock merge candidates have a range from 1 to 5.

* * * * *